United States Patent
Takeuchi et al.

(10) Patent No.: US 7,165,133 B2
(45) Date of Patent: Jan. 16, 2007

(54) MULTIPROCESSOR SYSTEM HAVING SHARED BUSES, PRIORITIZED ARBITRATION, AND CLOCK SYNCHRONIZATION CIRCUITRY

(75) Inventors: Toshiki Takeuchi, Tokyo (JP); Hiroyuki Igura, Tokyo (JP)

(73) Assignee: NEC Corporation (JP)

( * ) Notice: Subject to any disclaimer, the term of this patent is extended or adjusted under 35 U.S.C. 154(b) by 193 days.

(21) Appl. No.: 10/831,918

(22) Filed: Apr. 26, 2004

(65) Prior Publication Data

US 2004/0215857 A1 Oct. 28, 2004

(30) Foreign Application Priority Data

Apr. 24, 2003 (JP) .............................. 2003-120591

(51) Int. Cl.
*G06F 13/00* (2006.01)
*G06F 12/00* (2006.01)

(52) U.S. Cl. ...................... 710/110; 710/240; 710/100; 710/120; 370/364

(58) Field of Classification Search ................ 710/113, 710/110
See application file for complete search history.

(56) References Cited

U.S. PATENT DOCUMENTS

| | | | | |
|---|---|---|---|---|
| 5,481,456 A | * | 1/1996 | Ogura | 701/1 |
| 5,553,246 A | * | 9/1996 | Suzuki | 710/107 |
| 5,742,842 A | * | 4/1998 | Suetake et al. | 712/3 |
| 6,397,295 B1 | * | 5/2002 | Shagam | 711/121 |
| 6,581,120 B1 | * | 6/2003 | Ko | 710/262 |
| 6,618,777 B1 | * | 9/2003 | Greenfield | 710/120 |
| 6,928,499 B1 | * | 8/2005 | Kitakami | 710/104 |
| 6,976,108 B1 | * | 12/2005 | Kim et al. | 710/240 |
| 7,032,046 B1 | * | 4/2006 | Horii et al. | 710/113 |
| 2002/0126660 A1 | * | 9/2002 | Watanabe et al. | 370/364 |

FOREIGN PATENT DOCUMENTS

| | | |
|---|---|---|
| JP | 04-195552 | 7/1992 |
| JP | 05-006333 | 1/1993 |
| JP | 2000-330877 | 11/2000 |

* cited by examiner

*Primary Examiner*—Rehana Perveen
*Assistant Examiner*—Brian Misiura
(74) *Attorney, Agent, or Firm*—Ostrolenk, Faber, Gerb & Soffen, LLP

(57) ABSTRACT

A multiprocessor system having a plurality of processor elements each of which obtains right to use bus of a first or second shared bus in response to a transfer request for control system data or input/output data and as a master, conducts multiplex-transfer or burst-transfer, in which the processor element outputs a bus request signal for the first shared bus in response to a transfer request for the control system data and as a master, transfers and outputs a selection signal, a control signal and an address signal of a transfer destination and the control system data in one cycle in response to application of a bus grant signal, and is selected as a slave based on the selection signal through the first shared bus to receive input of the control system data and process the data based on the control signal and the address signal.

18 Claims, 19 Drawing Sheets

STEP1

STEP2

STEP3

DEDICATED TYPE

SHARED TYPE

CONVENTIONAL TYPE

MULTIPROCESSOR SYSTEM HAVING SHARED BUSES, PRIORITIZED ARBITRATION, AND CLOCK SYNCHRONIZATION CIRCUITRY

BACKGROUND OF THE INVENTION

1. Field of the Invention

The present invention relates to a multiprocessor system and, more particularly, to a multiprocessor system which conducts data transfer through a plurality of shared buses.

2. Description of the Related Art

As conventional multiprocessor systems of this kind, other than a multiprocessor system in which each processor element fixedly serves as a master or a slave, there are multiprocessor systems in which each processor element is dynamically operable as a master or a slave, so that message transfer between processor elements and input/output transfer between a processor element and an input/output device are respectively conducted by using a plurality of shared buses in order to efficiently execute data transfer between the processor elements.

FIG. 24, for example, is a block diagram showing an example of a structure of this conventional multiprocessor system (see Japanese Patent Laying-Open (Kokai) No. Heisei 5-6333).

The conventional multiprocessor system includes a plurality of processors 12-1 and 12-2 and a plurality of bus controllers 13-1 and 13-2 which respectively form processor elements, and a plurality of input/output devices 16-1, 16-2 and 16-3 and a plurality of adaptors 15-1 and 15-2, with the plurality of processors 12-1, 12-2 connected to a plurality of shared buses 14-1, 14-2 through the plurality of bus controllers 13-1 and 13-2 and with the plurality of input/output devices 16-1, 16-2 and 16-3 connected to the plurality of shared buses 14-1 and 14-2 through the plurality of adaptors 15-1 and 15-2.

Each of the plurality of processors 12-1 and 12-2 includes an input/output processing unit and a message communication processing unit as a kernel processing unit of an operating system.

In response to an input/output request to the input/output devices 16-1, 16-2 and 16-3, the input/output processing device hands over address information and transfer data information of the input/output device to the bus controllers 13-1 and 13-2 to respectively activate input/output. Then, when input/output is completed, the unit receives an interruption notification from the bus controllers 13-1 and 13-2 to notify a program having issued the input/output request of the completion.

Upon receiving a request for data communication between processors, the message communication processing unit hands over address and transfer data information of a requesting processor to the bus controllers 13-1 and 13-2 to make a data transmission request. In reception processing, when data transmission is made from other processor, the unit receives an interruption notification from the bus controllers 13-1 and 13-2 to receive data and hands over the data to a requesting source program.

In this conventional multiprocessor system, each processor element serves as a master or a slave to conduct input/output transfer to/from the input/output device and message transfer between the processor elements by using the plurality of shared buses 14-1 and 14-2. Since one bus can be commonly used for input/output transfer and message transfer, a plurality of message transfers and a plurality of input/output transfers can be simultaneously conducted by using the plurality of shared bus according to a volume of data transferred between the processor elements and transfer traffic. Therefore, as long as the number of requests made simultaneously for data transfer including those for message transfer and for input/output transfer is not more than the number of shared buses, no processing will be kept waiting because of busyness of a bus.

In general, the following demands are made on a shared bus which conducts data transfer between a plurality of processor elements in a multiprocessor system.

(1) In terms of performance, to realize high-speed data transfer with a small circuit area and lower power consumption.

(2) In terms of easiness of expansion and reuse of resources, even when physical addition, modification or deletion is made of a processor element, to minimize design change of other processor element and a shared bus.

(3) In terms of easiness of verification, to selectively monitor conditions of data transfer between the processor elements and debug information of each processor element.

In the above-described conventional multiprocessor system, being separated from input/output transfer of the input/output device, message transfer between processor elements is conducted at a high speed without waiting for input/output transfer to end. When the volume of transfer data in message transfer between the processor elements is large, however, a time period where the shared bus is occupied is long to make message transfer between other processor elements wait, which causes a problem that high-speed data transfer between the processor elements is difficult as a whole of the system.

When the number of shared buses is increased in order to cope with this problem, another problem occurs that overhead in circuit scale will be enormous.

On the other hand, even when the volume of transferred data in message transfer between the processor elements is small, because it is necessary to generate an interruption to processing of an internal processor of a processor element and conduct interruption processing at each message transfer, efficiency of data transfer by the internal processor of the processor element will be relatively decreased.

Moreover, at the time of debugging of a program of the entire system or a processor element, it is impossible to selectively monitor conditions of data transfer between the processor elements and debug information of each processor element, so that debugging efficiency is low.

As a countermeasure against the problem, when a bus monitoring circuit or an address tracing function is mounted for each shared bus or processor element as disclosed in Japanese Patent Laying-Open (Kokai) NO. 2000-330877 or Japanese Patent Laying-Open (Kokai) No. Heisei 4-195552, for example, another problem occurs that overhead in circuit scale will be enormous.

SUMMARY OF THE INVENTION

An object of the present invention is accordingly to provide a multiprocessor system which speeds up data transfer between processor elements and improves data processing efficiency of an internal processor of a processor element while minimizing an increase in a circuit scale.

Another object of the present invention is to provide a multiprocessor system enabling debug efficiency to be improved.

According to the first aspect of the invention, a multiprocessor system having a plurality of processor elements each conducting data processing to obtain right to use bus of a plurality of shared buses in response to a transfer request for control system data or input/output data and as a master, conduct multiplex-transfer or burst-transfer, wherein the processor element outputs a bus request signal for a specific shared bus in response to a transfer request for the control system data and as a master, transfers and outputs a selection signal, a control signal and an address signal of a transfer destination and the control system data in one cycle in response to application of a bus grant signal, and the processor element is selected as a slave based on the selection signal through the specific shared bus to receive input of the control system data and process the data based on the control signal and the address signal.

In the preferred construction, the plurality of shared buses include a first shared bus and a second shared bus.

In another preferred construction, the multiprocessor system comprises a shared bus circuit which receives input of the selection signal, the control signal, the address signal and the control system data from the plurality of processor elements, selectively and switchedly outputs the signals and the data to a specific shared bus corresponding to right to use bus of the specific shared bus and selects one of the plurality of processor elements as a slave based on the selection signal through the specific shared bus to output the control signal, the address signal and the control system data, and a bus arbiter which accepts a bus request signal from the plurality of processor elements in each cycle and issues a bus grant signal of the specific shared bus to a processor element having the highest priority to arbitrate rights to use bus for a subsequent cycle.

In another preferred construction, the shared bus circuit includes a multiplexer which receives input of the selection signal, the control signal, the address signal and the control system data from the plurality of processor elements to selectively and switchedly output the signals and the data to the specific shared bus corresponding to right to use bus of the specific shared bus, a decoder which decodes the selection signal on the specific shared bus to select one of the plurality of processor elements as a slave of a transfer destination, and a demultiplexer which receives input of the control signal, the address signal and the control system data on the specific shared bus to switchedly distribute the signals and the data to a slave of a transfer destination according to output of the decoder.

In another preferred construction, the processor element conducts write transfer of outputting a bus request signal of the specific shared bus in response to a transfer request of the control system data, as a master, transferring and outputting the control system data in response to application of a bus grant signal and as a slave selected based on the selection signal through the specific shared bus, receiving input of the control system data to conduct memory write based on the control signal and the address signal, read return request transfer of outputting a bus request signal of the specific shared bus in response to a transfer request for control system data including a return destination code, as a master, transferring and outputting the return destination code in response to application of a bus grant signal and as a slave selected based on the selection signal through the specific shared bus, receiving input of the return destination code and reading memory data based on the control signal and the address signal to make a return request with the read memory data as control system data, and return write transfer of outputting a bus request signal of the specific shared bus in response to the return request, as a master, transferring and outputting a selection signal corresponding to the return destination code in response to application of a bus grant signal and as a slave selected based on the selection signal through the specific shared bus, receiving input of the control system data to conduct memory write based on the control signal and the address signal.

In another preferred construction, the multiprocessor system comprises a shared bus circuit which receives input of the selection signal, the control signal, the address signal and the control system data from the plurality of processor elements, selectively and switchedly outputs the signals and the data to a specific shared bus corresponding to right to use bus of the specific shared bus and selects one of the plurality of processor elements as a slave based on the selection signal through the specific shared bus to output the control signal, the address signal and the control system data, and a bus arbiter which accepts a bus request signal from the plurality of processor elements in each cycle and issues a bus grant signal of the specific shared bus to a processor element having the highest priority to arbitrate rights to use bus for a subsequent cycle, wherein the processor element conducts write transfer of outputting a bus request signal of a first shared bus in response to a transfer request of the control system data, as a master, transferring and outputting the control system data in response to application of a bus grant signal and as a slave selected based on the selection signal through the specific shared bus, receiving input of the control system data to conduct memory write based on the control signal and the address signal, read return request transfer of outputting a bus request signal of the specific shared bus in response to a transfer request for control system data including a return destination code, as a master, transferring and outputting the return destination code in response to application of a bus grant signal and as a slave selected based on the selection signal through the specific shared bus, receiving input of the return destination code and reading memory data based on the control signal and the address signal to make a return request with the read memory data as control system data, and return write transfer of outputting a bus request signal of the specific shared bus in response to the return request, as a master, transferring and outputting a selection signal corresponding to the return destination code in response to application of a bus grant signal and as a slave selected based on the selection signal through the specific shared bus, receiving input of the control system data to conduct memory write based on the control signal and the address signal.

In another preferred construction, a first shared bus circuit includes a multiplexer which receives input of the selection signal, the control signal, the address signal and the control system data from the plurality of processor elements to selectively and switchedly output the signals and the data to the specific shared bus corresponding to right to use bus of the specific shared bus, a decoder which decodes the selection signal on the specific shared bus to select one of the plurality of processor elements as a slave of a transfer destination, and a demultiplexer which receives input of the control signal, the address signal and the control system data on the specific shared bus to switchedly distribute the signals and the data to a slave of a transfer destination according to output of the decoder, wherein the processor element conducts write transfer of outputting a bus request signal of the first shared bus in response to a transfer request of the control system data, as a master, transferring and outputting the control system data in response to application of a bus grant signal and as a slave selected based on the selection signal through the specific shared bus, receiving input of the control system data to conduct memory write based on the control signal and the address signal, read return request transfer of outputting a bus request signal of the specific shared bus in response to a transfer request for control system data including a return destination code, as a master, transferring and outputting the return destination code in response to application of a bus grant signal and as a slave selected based on the selection signal through the specific shared bus, receiving input of the return destination code and reading memory data based on the control signal and the address signal to make a return request with the read memory data as control system data, and return write transfer of outputting a bus request signal of the specific shared bus in response to the return request, as a master, transferring and outputting a selection signal corresponding to the return destination code in response to application of a bus grant signal and as a slave selected based on the selection signal through the specific shared bus, receiving input of the control system data to conduct memory write based on the control signal and the address signal.

In another preferred construction, the processor element, as a slave selected based on the selection signal through the specific shared bus, makes a memory write or memory read return request not by internal interruption processing but by means of a dedicated memory control unit based on the control signal and the address signal.

In another preferred construction, the processor element conducts interruption request transfer of outputting a bus request signal of the specific shared bus in response to a transfer request for control system data including an interruption request, as a master, transferring and outputting the interruption request in response to application of a bus grant signal, being selected based on the selection signal through the specific shared bus and as a slave, receiving input of the interruption request to conduct internal interruption processing corresponding to the interruption request based on the control signal and the address signal.

In another preferred construction, the interruption request includes an interruption factor and a transfer source code.

In another preferred construction, the multiprocessor system comprises a debugging processing element which snoops the control system data and the input/output data on the plurality of shared buses according to coincidence in a transfer path and an address range to store the data in a debugging memory.

In another preferred construction, the processor element traces an execution instruction address of an internal processor to generate trace data as control system data and outputs a bus request signal for the specific shared bus in response to a transfer request for the data to, as a master, transfer and output the trace data in response to application of a bus grant signal.

In another preferred construction, the processor element traces an execution instruction address of an internal processor to generate trace data as control system data and outputs a bus request signal for the specific shared bus in response to a transfer request for the data to, as a master, transfer and output the trace data in response to application of a bus grant signal, and the debugging processing element, as a slave selected based on the selection signal through the specific shared bus, receives input of the trace data to store the data in the debugging memory based on the control signal and the address signal.

In another preferred construction, the multiprocessor system comprises a clock generation circuit which generates, in synchronization with a basic clock signal of the processor element and according to transfer traffic of the specific shared bus, a bus clock signal whose frequency is an integral multiple of a frequency of the basic clock signal, an arbiter synchronization circuit which receives input of a bus request signal of the specific shared bus from the processor element to output the signal to a bus arbiter in synchronization with the bus clock signal and receives input of a bus grant signal of the specific shared bus from the bus arbiter to output the signal to the processor element in synchronization with the basic clock signal, and a slave synchronization circuit which receives input of the selection signal, the control signal, the address signal and the control system data through the specific shared bus to output the signals and the data to the processor element in synchronization with the basic clock signal, wherein the bus arbiter accepts a bus request signal of the specific shared bus from the plurality of processor elements through the arbiter synchronization circuit once in each cycle of the basic clock signal and issues a bus grant signal of the specific shared bus to a processor element having the highest priority in each bus cycle of the bus clock signal through the arbiter synchronization circuit to arbitrate rights to use bus in each bus cycle of a subsequent cycle.

In another preferred construction, the multiprocessor system comprises a processor element which operates as one of the plurality of processor elements to output a bus request signal of other shared bus than the specific shared bus in response to a transfer request for the input/output data and as a master, burst-transfers the input/output data in response to application of a bus grant signal, and a processor element which operates as one of the plurality of processor elements to, as a slave connected through the other shared bus, burst-transfer the input/output data.

In another preferred construction, the multiprocessor system comprises a second shared bus circuit which selectively and switchedly connects a processor element operating as a master or a slave of the other shared bus to the other shared bus according to right to use bus of the other shared bus to burst-transfer the input/output data between the master and the slave through the other shared bus, and a second bus arbiter which accepts a bus request signal of the other shared bus from the plurality of processor elements in each cycle and issues a bus grant signal of the other shared bus to a processor element having the highest priority to arbitrate rights to use bus.

According to another aspect of the invention, a multiprocessor system having a plurality of processor elements each conducting data processing to obtain right to use bus of a plurality of shared buses in response to a transfer request for control system data or input/output data and as a master, conduct multiplex-transfer or burst-transfer, wherein the processor element, as a master, transfers and outputs a selection signal, a control signal and an address signal of a transfer destination and the control system data through a specific shared bus in response to a transfer request for the control system data, and the processor element selected as a slave based on the selection signal through the specific shared bus receives input of the control system data and processes the data based on the control signal and the address signal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
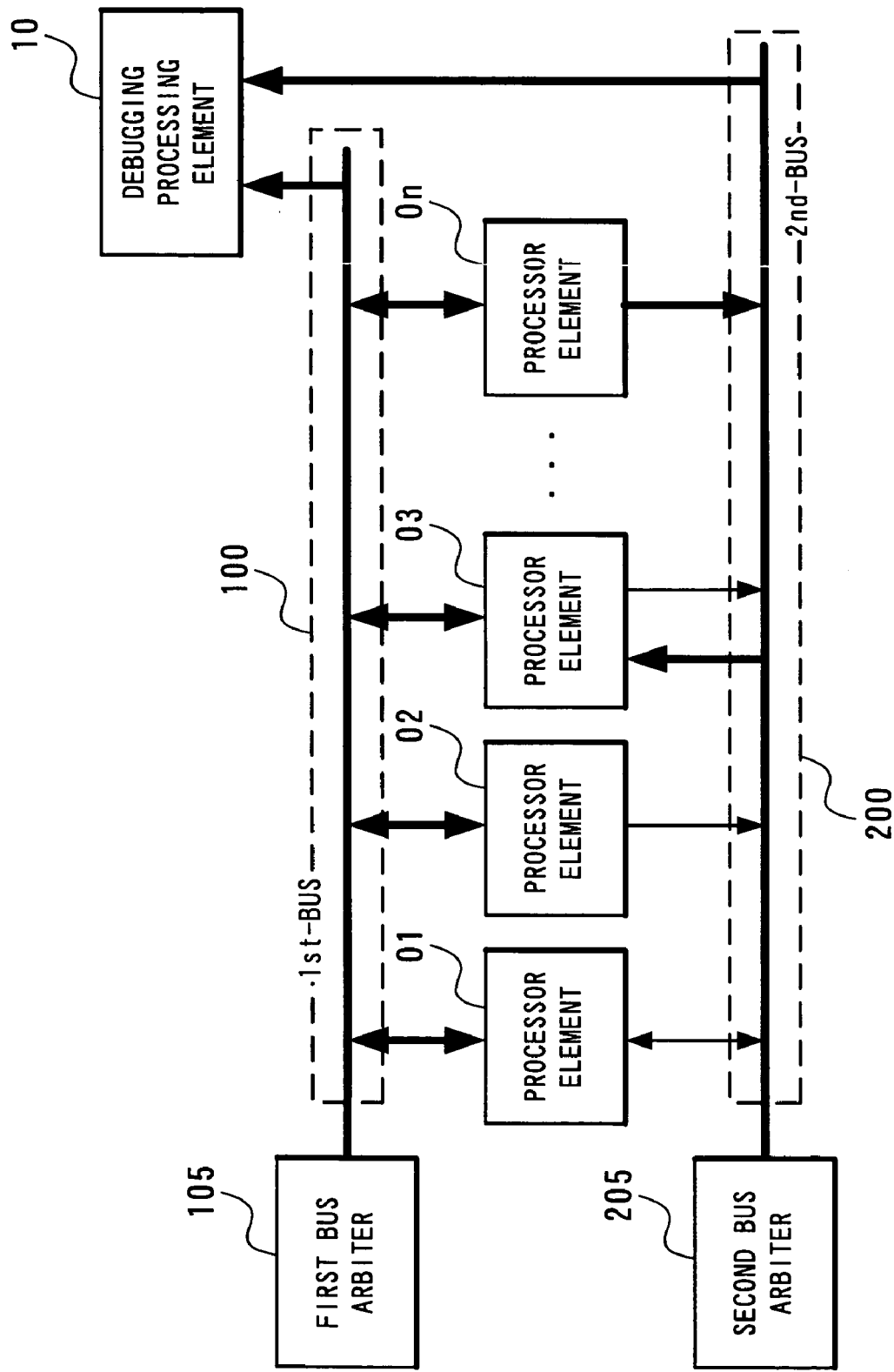
FIG. 1 is a block diagram showing a first embodiment of a multiprocessor system according to the present invention as a whole.

Next, the present invention will be described with reference to the drawings. FIG. 1 is a block diagram showing a first embodiment of a multiprocessor system according to the present invention as a whole. With reference to FIG. 1, the multiprocessor system according to the present embodiment includes a plurality of processor elements 01~0n, first and second shared bus circuits 100 and 200, first and second bus arbiters 105 and 205 and a debugging processing element 10.

Figure 14:
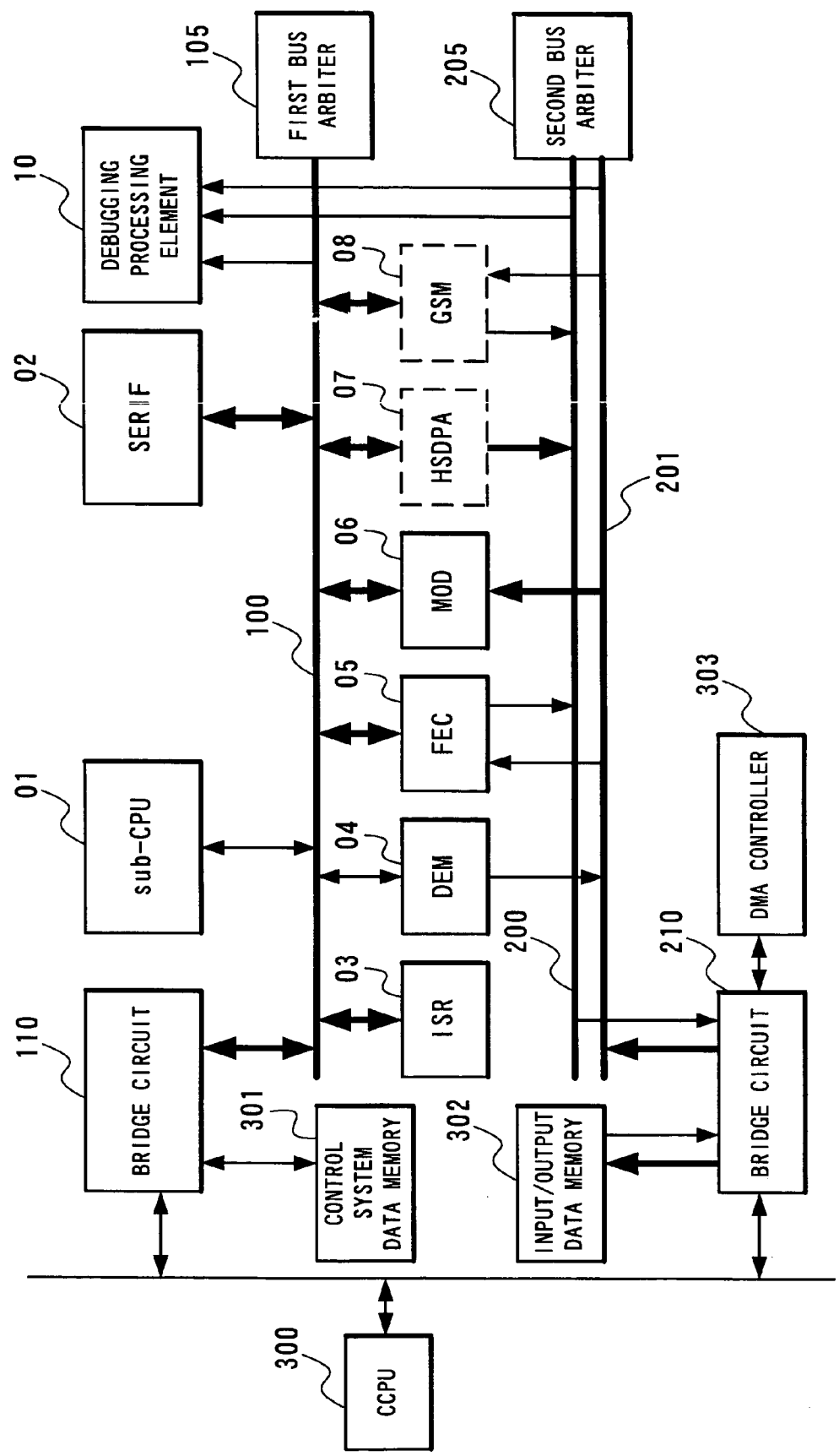
FIG. 14 is a block diagram showing a specific example in which the multiprocessor system shown in FIG. 1 is applied to a specific W-CDMA digital baseband LSI.

The plurality of processor elements 01~0n each process data and unlike the processor elements in the conventional multiprocessor system shown in FIG. 14, divide transfer data of all the data transfer by the processor elements into two kinds, control system data and input/output data, and acquire right to use bus of the first or second shared bus according to a transfer request for control system data or input/output data to conduct multiplex-transfer or burst-transfer as a master.

Possible components in each processor element include, for example, an internal processor such as MPU or DSP which conducts various kinds of operations and control within a processor element, a storage device such as a memory or a register, a dedicated hardware accelerator which conducts data processing and a data input/output device (DMA controller), to which the embodiment of the present invention is not necessarily limited.

In addition, at least one of the plurality of processor elements 01~0n outputs a bus request signal for the second shared bus according to an input/output data transfer request and as a master, burst-transfers input/output data in response to the application of a bus grant signal as is conventionally done and at least one of the plurality of processor elements 01~0n, as a slave connected through the second shared bus, burst-transfers input/output data as is conventionally done.

The first and second shared bus circuits 100 and 200 transfer control system data and input/output data between the processor elements 01~0n through the first and second shared buses in manners different from each other. The first shared bus circuit 100, which has only a minimum necessary write transfer function, conducts bidirectional multiplex-transfer in every cycle between a part or all the processor elements, while the second shared bus circuit 200, with processor elements to which transfer is made and a transfer direction limited, conducts burst-transfer from a master to a slave or from a slave to a master. These first and second shared buses can physically exist one each or in the plural within one multiprocessor. When a plurality of second shared buses exist, processor elements connected to the buses and bus specifications need not to be the same.

The first and second bus arbiters 105 and 205 accept a bus request for the first and second shared buses from the plurality of processor elements 01~0n in every cycle and issue a bus grant signal for the first and second shared buses to a processor element whose priority is the highest to arbitrate rights to use the first and second buses.

The debugging processing element 10 is capable of snooping control system data and input/output data on the first and second shared buses according to coincidence in a transfer path and an address range and storing the same in a debugging memory to conduct monitor output.

As described above, in the multiprocessor system according to the present embodiment, data whose volume transferred at once is small and which has a possibility of being transferred between all the processors elements, representatives of which are an operation timing signal and a parameter setting signal, is multiplex-transferred as control system data from a master to a slave between the plurality of processor elements 01~0n by using the first shared bus. On the other hand, data whose volume transferred at once is large and whose transfer path is determined in advance, representative of which is stream data, is burst-transferred as input/output data between limited master and slave in the plurality of processor elements 01~0n by using the second shared bus.

In other words, transfer whose traffic is heavy and which might affect other transfer and the entire system performance when made by using the first shared bus is conducted by using the second shared bus. This enables specification of the first shared bus 100, which has numbers of connection destinations to become complicated, to be simplified as much as possible.

In addition, the debugging processing element 10 enables, only when a transfer path and an address of transfer data or a signal on the first and second shared buses agree with a desired range, the transfer data to be snooped and stored in an internal debugging memory to monitor the data. At this time, in order to simultaneously monitor transfer data on the first and second shared buses, the debugging processing element 10 may have, without causing any problem, a function of monitoring the data while switching by using a multiplexer or the like with a speed of the operation clock increased.

Next, detailed description will be made of data transfer through the first and second shared buses in the multiprocessor system according to the present embodiment.

Figure 2:
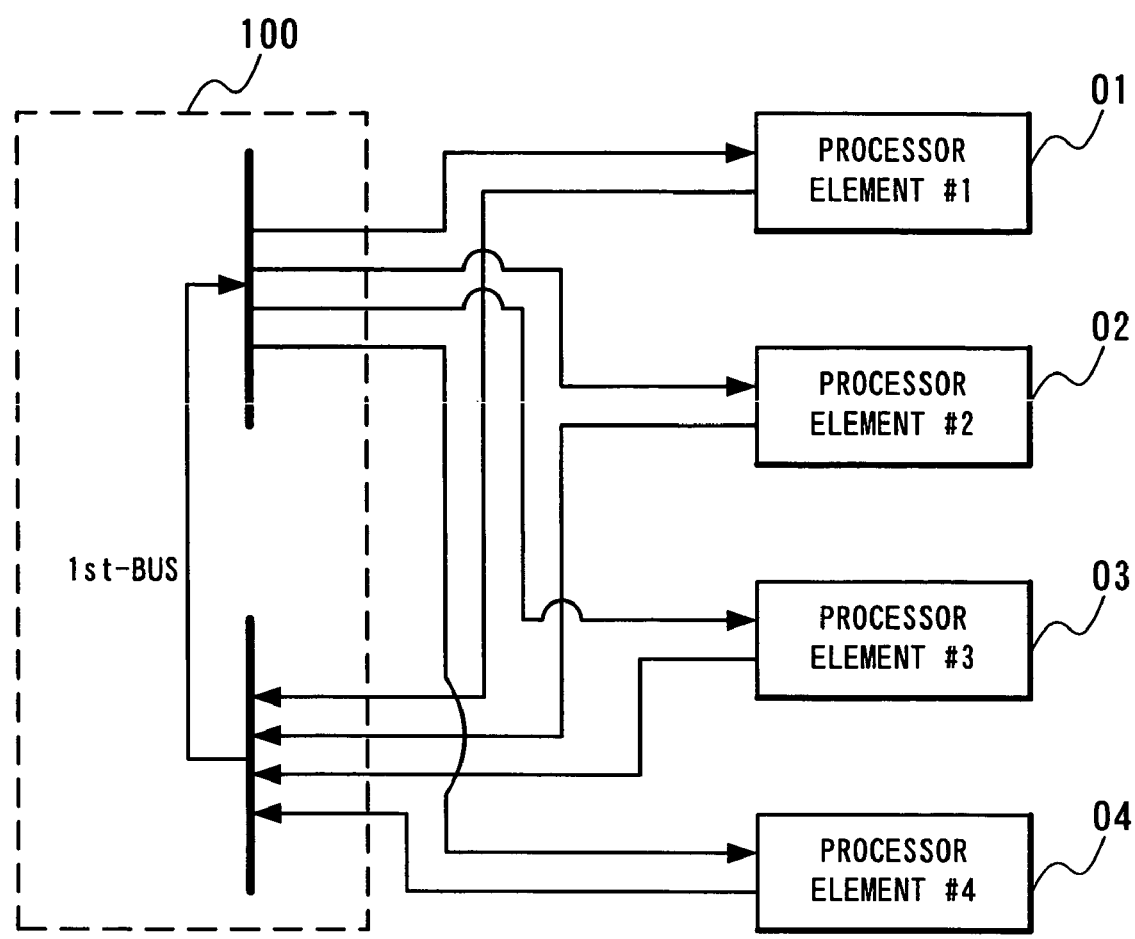
FIG. 2 is a diagram for use in explaining data transfer through a first shared bus illustrated in FIG. 1.

FIG. 2 is a diagram for use in explaining data transfer through the first shared bus in the multiprocessor system according to the present embodiment. In data transfer through the first shared bus, as illustrated in FIG. 2, a processor element which conducts transfer dynamically changes its function as a mater or a slave, so that data transfer through the first shared bus is allowed between all the processor elements. This arrangement eliminates the need of activating a specific processor element as a master for data transfer itself through the first shared bus, enabling data transfer through the first shared bus between bus interfaces of the respective processor elements to allow transfer efficiency to be increased and power consumption to be reduced.

Figure 3:
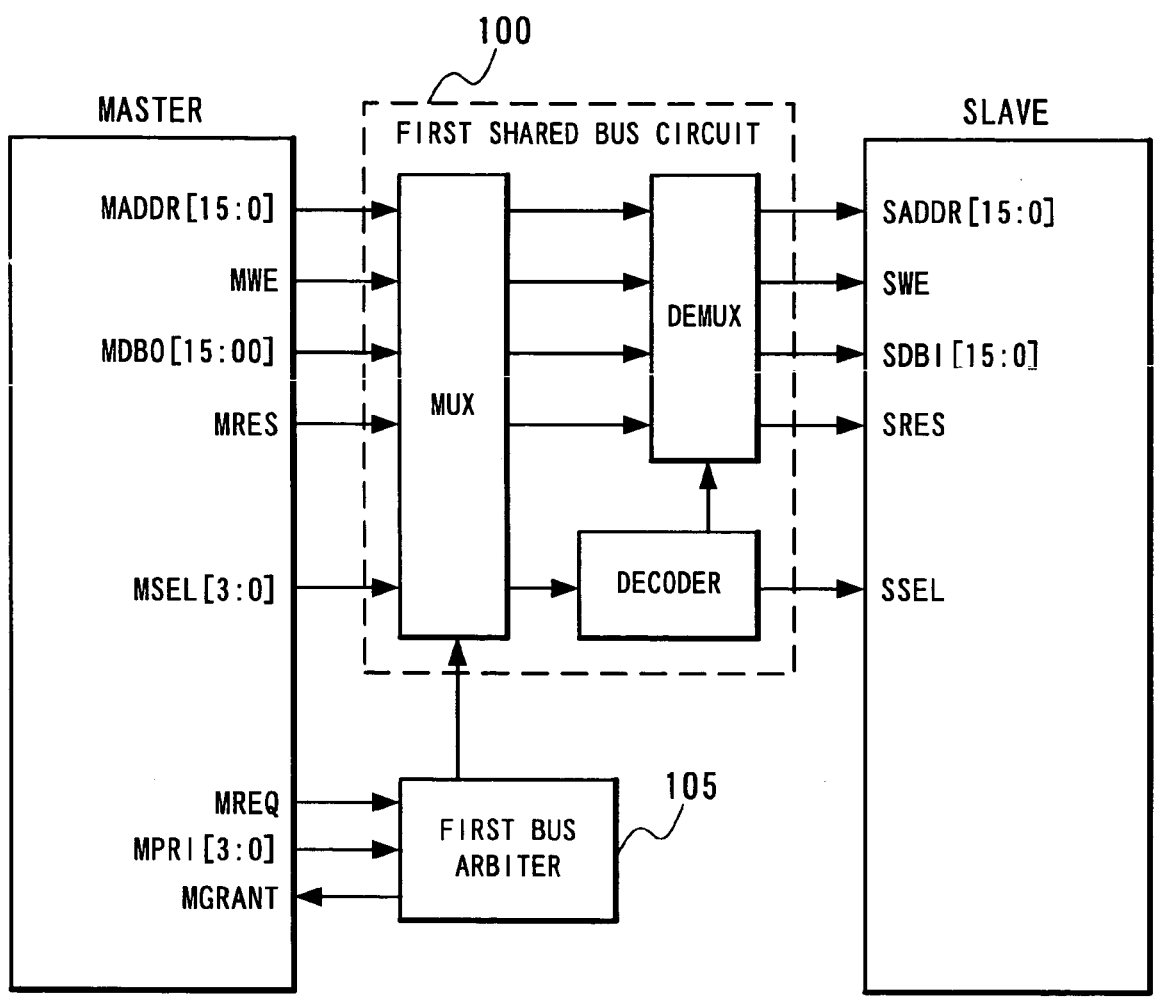
FIG. 3 is a block diagram showing an example of an internal structure of a first shared bus circuit 100 and an example of its peripheral connection in FIG. 1.
Figure 4:
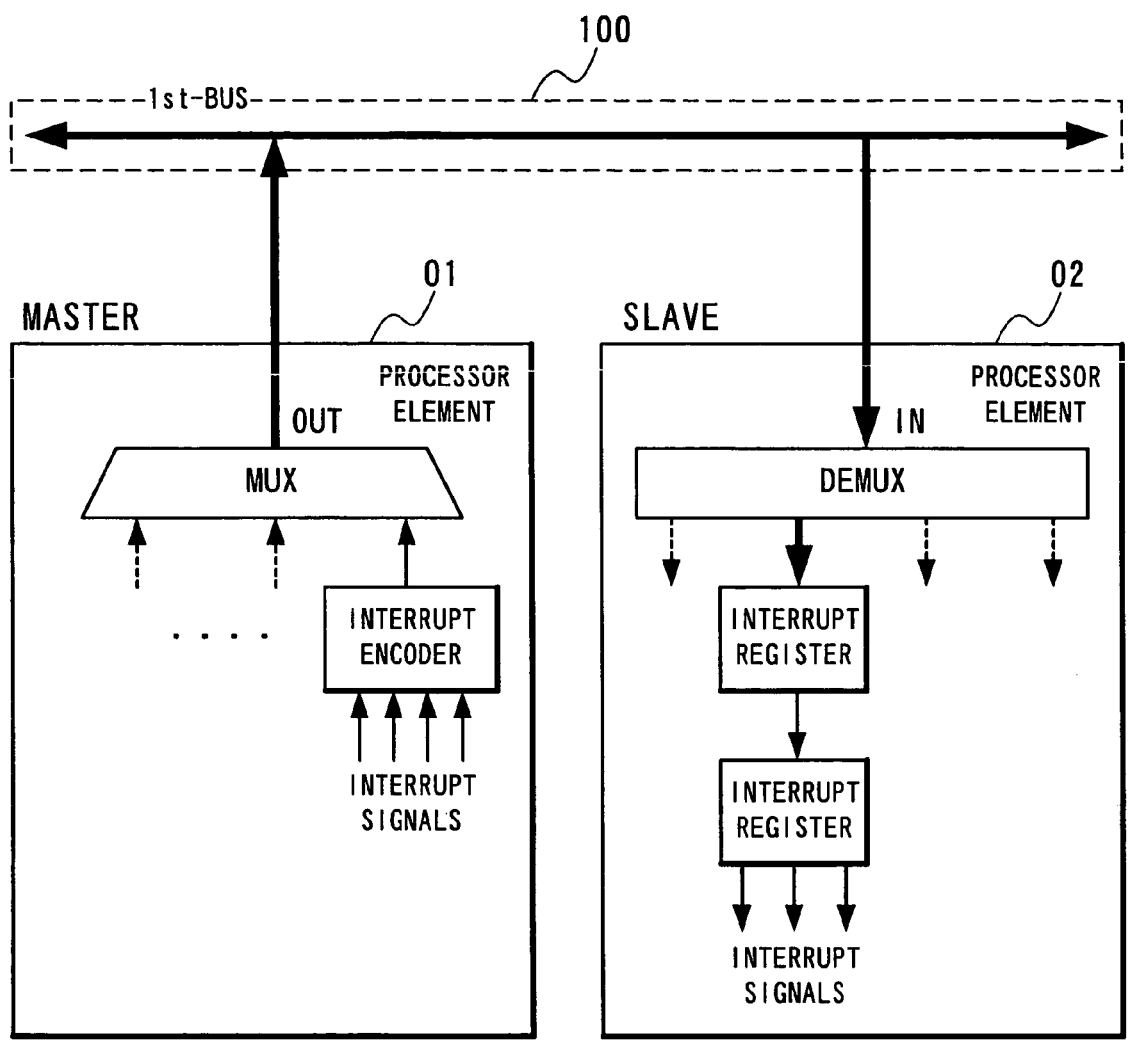
FIG. 4 is a partial block diagram showing a part of interfaces on a master side and a slave side of the first shared bus in each processor element illustrated in FIG. 1.

FIG. 3 is a block diagram showing an example of an internal structure of the first shared bus circuit 100 and an example of its peripheral connection, while FIG. 4 is a partial block diagram showing a part of master side and slave side interfaces of the first shared bus in a processor element.

With reference to FIG. 3, the first shred bus circuit 100 includes a multiplexer, a decoder and a demultiplexer. Here, the multiplexer receives input of a selection signal MSEL, control signals MWE, MRES, an address signal MADDR and control system data MDBO from a processor element operating as a master of the first shared bus and selectively and switchedly outputs the signal to the first shared bus in response to a signal corresponding to right to use bus for the first shared bus from the first arbiter 105, the decoder selects a selection signal on the first shared bus to select one of the plurality of processor elements 01~0n as a slave of a transfer destination and the demultiplexer receives a control signal, an address signal and control system data on the first shared bus to switchedly distribute the signal and data to a processor element as the transfer destination operating as a slave of the first shared bus according to output of the decoder.

As described in the foregoing, while with a conventional bus, the circuit structure should be made taking both write transfer (from master to slave) and read transfer (from slave to master) into consideration, the first shared bus circuit 100 of the present embodiment is structured to enable only write transfer. Even with such a circuit structure, because all the processor elements can be a master, bidirectional data transfer can be realized to scale down the circuit. In addition, although the first shared bus circuit 100 shown in FIG. 3 adopts a MUX-type bus structure in view of easiness of implementation of logic composition and the like, the circuit can take other bus structure such as three-state type without causing any problem as long as easiness of implementation and estimation of operation delay permit.

Each of the processor elements 01~0n outputs a bus request signal MREQ of the first shared bus in response to a control system data transfer request to transfer and output, as a master, the selection signal MSEL, the control signals MWE, MRES, the address signal MADDR and the control system data MDBO of a transfer destination through each output terminal in response to application of a bus grant signal MGRANT in one cycle and on the other hand, is selected as a slave based on the selection signal through the first shared bus to receive input of the control system data and process the data based on the control signal and the address signal. As illustrated in FIG. 4, the interface of the first shared bus in each of the processor elements 01~0n includes a master output unit which encodes an interruption request signal to transfer and output the signal as control system data and a slave input unit which temporarily holds the transferred and applied control system data and decodes the same to generate an interruption request signal.

The first arbiter 105 receives the bus request signal MREG and a priority signal MPRI from the plurality of processor elements 01~0n in each cycle and issues the bus grant signal MGRANT of the first shared bus to a processor element having the highest priority to arbitrate rights to use bus for the first shared bus in the next cycle and output a signal to the first shared bus circuit 100.

Figure 5:
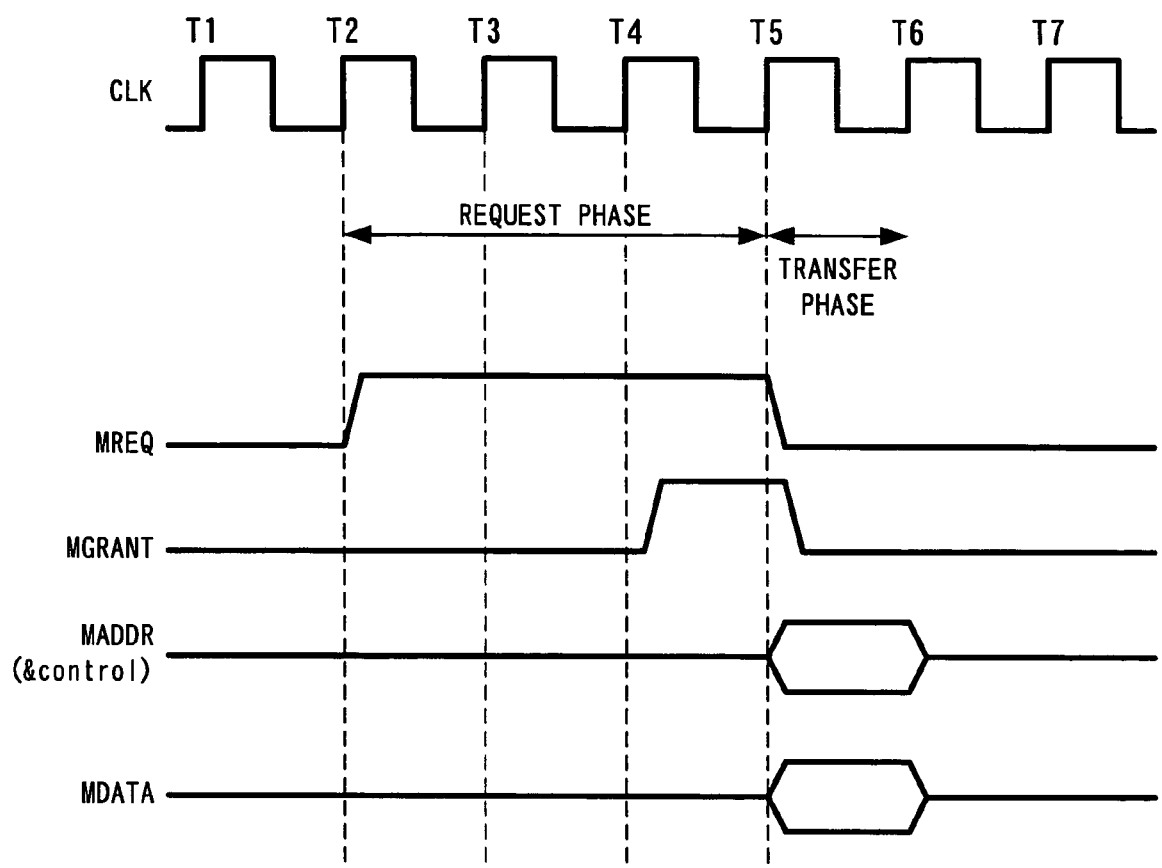
FIG. 5 is a timing chart showing an example of transfer of control system data by the first shared bus in FIG. 3.

FIG. 5 is a timing chart showing an example of transfer of control system data by the first shared bus. As shown in FIG. 5, data transfer by the first shared bus is realized by two kinds of phases, a request phase and a transfer phase. The request phase is a period, which needs one or a plurality of cycles, from issuance of a bus request signal by a processor element wishing to conduct transfer until when a bus grant signal indicative of grant of right to use bus becomes active. In the transfer phase, which is a period when a signal obtained by latching a bus grant signal by a clock signal is active is assigned to the processor element in question and is a period in which the processor element is allowed to be a master, transfer is basically conducted in one cycle.

More specifically, in one cycle subsequent to a cycle when a bus grant signal is issued to a master in the request phase, a control signal such as an address signal and a data signal are all output to complete transfer. When the data transfer ends, rise a bus request signal. Then, the bus arbiter is allowed to assign right to use bus to other processor element requesting bus assignment. A processor element which is selected by a master side selection signal MSEL to have a slave side selection signal SSEL attaining an active state becomes a slave to latch all the transfer data including the control signal and the data signal at the end clock timing of the transfer phase.

As described in the foregoing, the bus arbiter 105 switches right to use bus in every cycle in order to transfer the control system data through the first shared bus, and a cycle subsequent to a cycle in which the bus grant signal attains the active state is a period when the master has the right to use bus. Accordingly, each processor element needs to make a bus request to the bus arbiter every time when a control system data transfer request is made and conducts the following write transfer, read return request transfer and return write transfer or interruption request transfer in a multiplex mode of each cycle according to a kind of control system data based on the bus grant.

In write transfer, the processor element outputs a bus request signal for the first shared bus in response to a control system data transfer request, and as a master, transfers and outputs control system data according to input of a bus grant signal, and is selected as a slave by a selection signal through the first shared bus to receive input of the control system data and conduct memory write based on a control signal and an address signal.

In read return request transfer, the processor element outputs a bus request signal for the first shared bus in response to a transfer request for control data including a return destination code, as a master, transfers and outputs the return destination code according to input of a bus grant signal, and is selected as a slave by a selection signal through the first shared bus to receive input of the return destination code and read memory data based on a control signal and an address signal and make a return request for the control system data.

In return write transfer, the processor element outputs a bus request signal for the first shared bus in response to a return request for read return request transfer, as a master, transfers and outputs a selection signal corresponding to a return destination code according to input of a bus grant signal, and is selected as a slave by a selection signal through the first shared bus to receive input of control system data and conduct memory write based on a control signal and an address signal.

Figure 6:
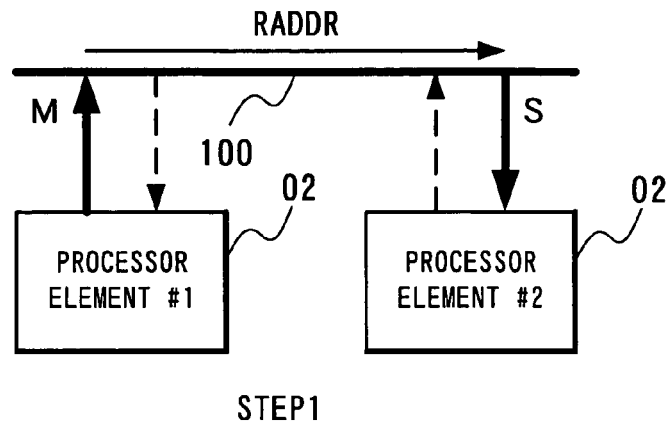
FIG. 6 is a diagram for use in explaining a sequence of operation of linking read return request transfer and return write transfer by the first shared bus shown in FIG. 3.
Figure 7:
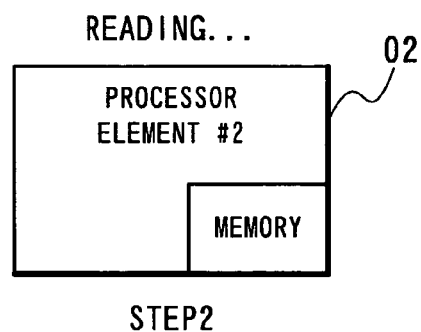
FIG. 7 is a diagram for use in explaining a sequence of operation of linking read return request transfer and return write transfer by the first shared bus shown in FIG. 3.
Figure 8:
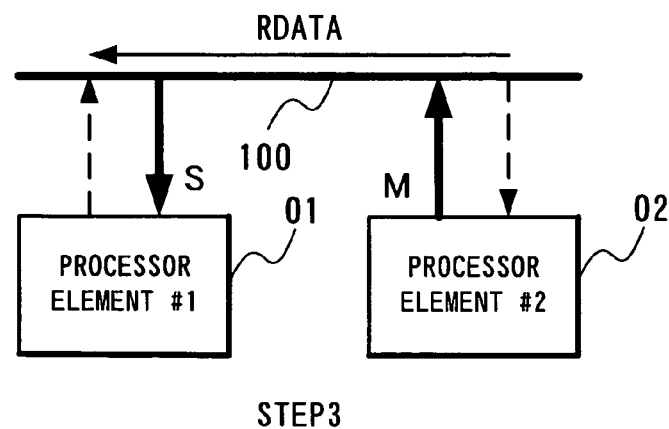
FIG. 8 is a diagram for use in explaining a sequence of operation of linking read return request transfer and return write transfer by the first shared bus shown in FIG. 3.

FIGS. 6, 7 and 8 are diagrams for use in explaining a sequence of operation of linking these read return request transfer and return write transfer. Here, FIGS. 6, 7 and 8 show operation of Steps 1, 2 and 3, respectively. As illustrated in FIGS. 6, 7 and 8, first at Step 1 in FIG. 6, the processor element 01 becomes a master in response to a transfer request for control system data including a return destination code to transfer an address RADDR and a return destination code of a memory to be read. At this time, by bringing a write enable signal MWE as one of the control signals into an inactive state, inform the processor element 02 as a slave that the request is a read return request. As the data output signal (MDBO), transfer the information that a requesting source is the processor element 01.

Next, at Step 2 in FIG. 7, the processor element 02 makes a read return request for data from an internal memory. During this period, the right to use bus is at the same time released to allow the bus arbiter to assign other data transfer to a bus.

Next, at Step 3 in FIG. 8, the processor element 02 this time becomes a master to return read data to a transfer destination corresponding to a return destination code. At this time, by bringing a response signal MRES as one of the control signals into the active state, notification that the transfer data is read data can be made. The notification can be also made by setting an address signal to indicate an address dedicated to read data return.

In these write transfer and read return request transfer or return write transfer, the processor element, as a slave selected based on a selection signal through the first shared bus, makes a memory write or memory read return request based on the control signal and the address signal not by internal interrupting processing of the internal processor but by a dedicated memory control circuit. As a result, speed of data transfer between the processor elements is increased to improve data processing efficiency in the internal processor of the processor element.

In interruption request transfer, the processor element, by means of the master output means and the slave input means of the interface of the first shared bus shown in FIG. 4, outputs the bus request signal of the first shared bus in response to a transfer request for control system data including an interruption request, as a master, transfers and outputs an interruption request in response to application of the bus grant signal, and is selected as a slave based on the selection signal through the first shared bus to receive input of the interruption request and conduct interruption request internal interruption processing based on the control signal and the address signal. At this time, it is also possible to at the master, transfer an interruption factor and a transfer source code as an interruption request and at the slave, conduct internal interruption processing according to the interruption factor and also conduct write transfer according to the transfer source code with the processing result as a master at the time of completion of the processing.

This interruption request transfer enables notification of data generation end timing or the like to be made to a CPU without using a dedicated line for an interruption request signal and enables, even when addition, modification, deletion of an interruption request signal or physical addition, modification, deletion of a processor element is made, design modification of other processor element and the shared bus to be minimized.

Figure 9:
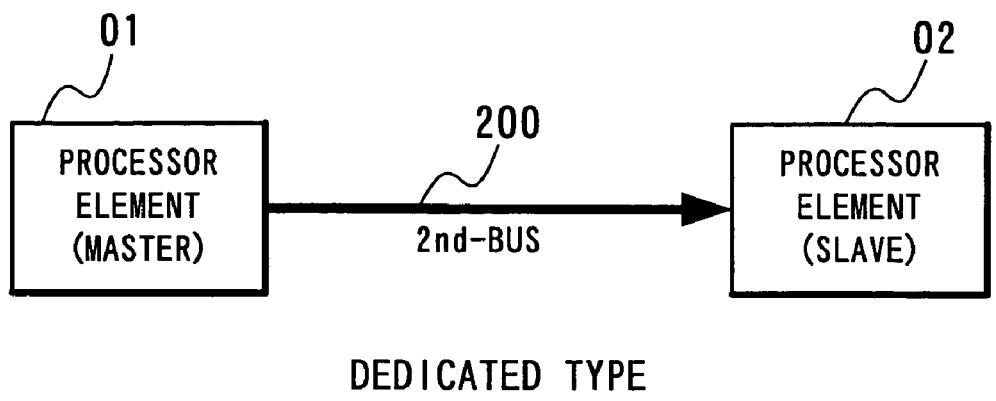
FIG. 9 is a diagram for use in explaining data transfer through a second shared bus in FIG. 1.
Figure 10:
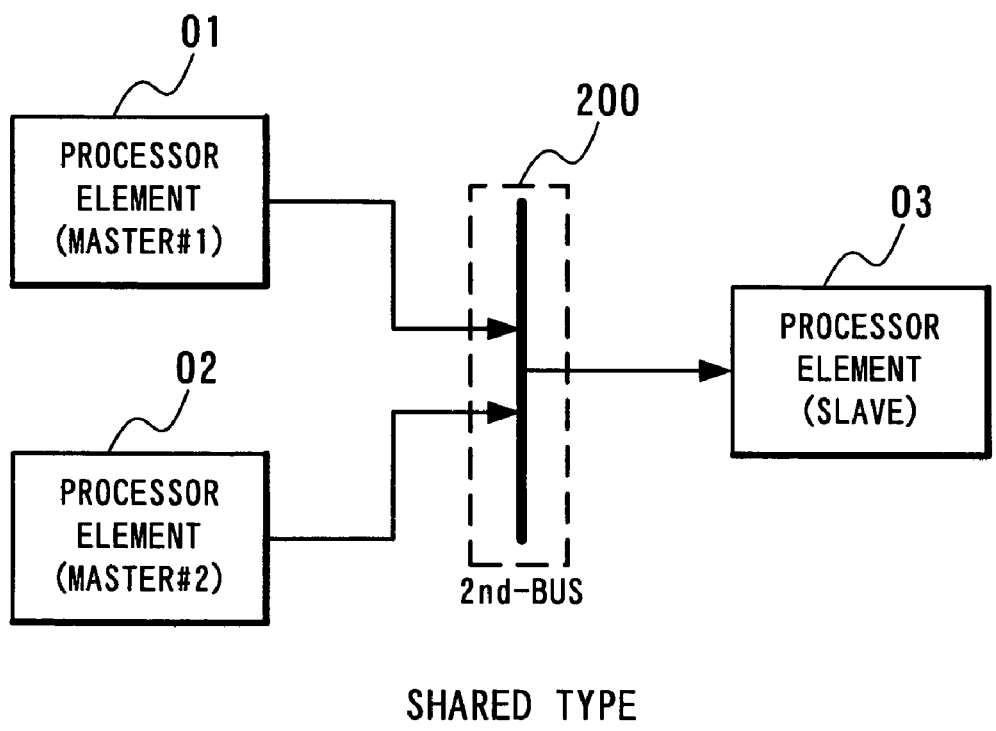
FIG. 10 is a diagram for use in explaining data transfer through the second shared bus in FIG. 1.
Figure 11:
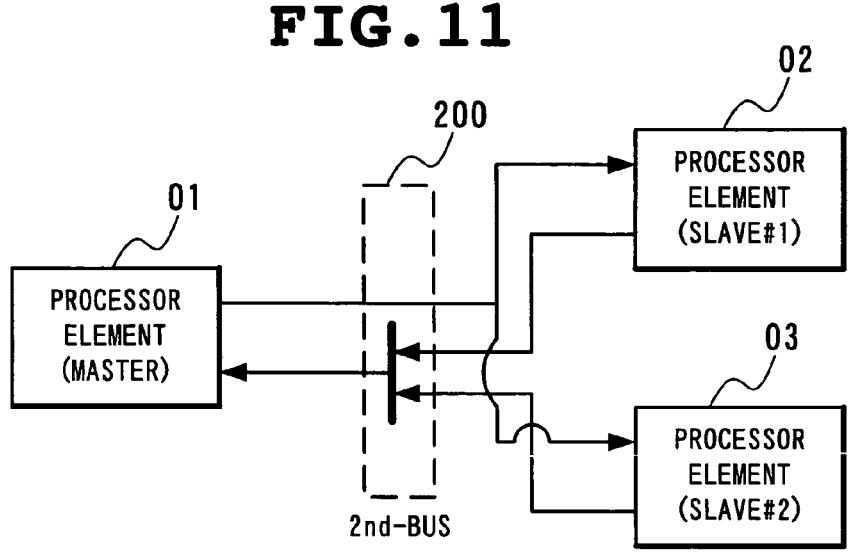
FIG. 11 is a diagram for use in explaining data transfer through the second shared bus in FIG. 1.

FIGS. 9, 10 and 11 are diagrams for use in explaining data transfer through the second shared bus in the multiprocessor system according to the present embodiment. Data transfer through the second shared bus is premised on transfer of input/output data whose transfer destination is determined in advance. Therefore, processor elements which conduct transfer are limited and it is highly probable that either a master or a slave will be a host processor, a DMA controller or a main memory of the multiprocessor system. In addition, transfer direction is limited to write transfer and is assumed to be one direction from a master to a slave. In data transfer through the second shared bus, possibly employed according to a transfer direction and transfer traffic are dedicated bus type in which one bus is limited to one transfer as shown in FIG. 9 and a shared bus type in which one bus is shared among a plurality of transfers as shown in FIG. 10. This arrangement realizes better reduction in a circuit scale than that in a circuit structure taking read transfer into consideration. Structure taking transfer in both directions between a master and a slave into consideration as shown in FIG. 11 causes no problem at all.

Figure 12:
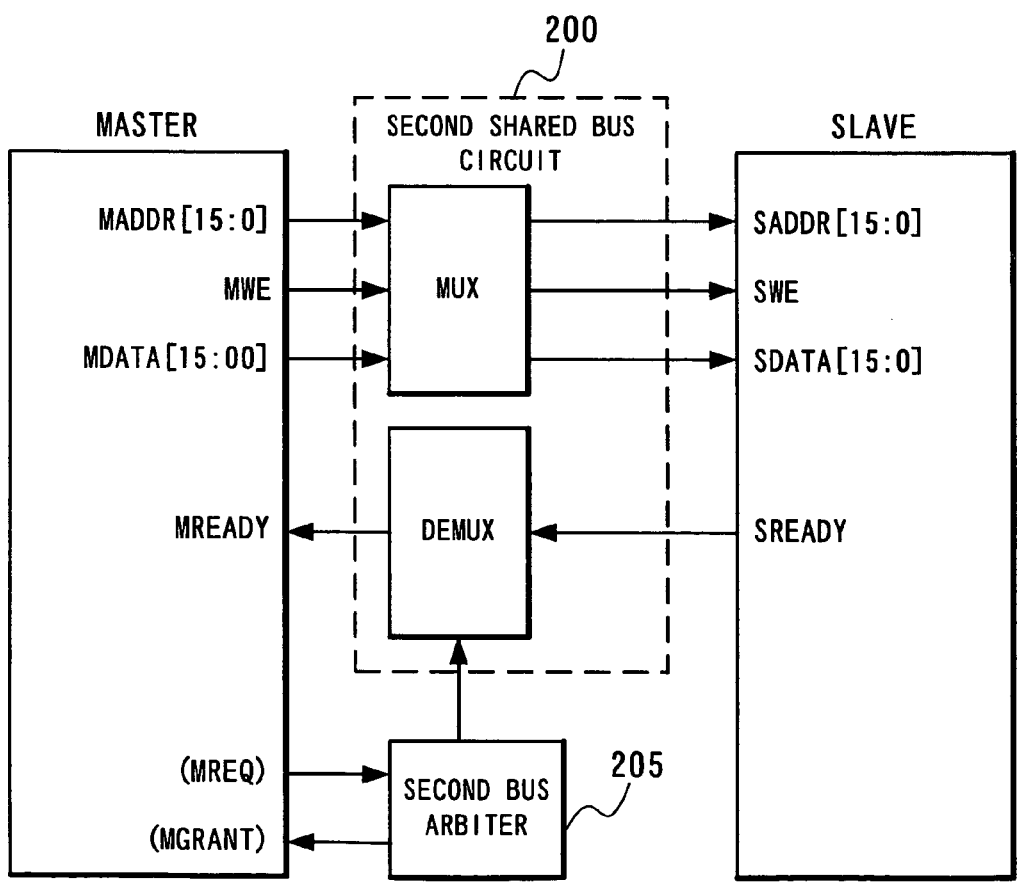
FIG. 12 is a block diagram showing an example of an internal structure of a second shared bus circuit 200 and an example of its peripheral connection in FIG. 1.

FIG. 12 is a block diagram showing an example of an internal structure of the second shared bus circuit 200 and an example of its peripheral connection. With reference to FIG. 12, the second shared bus circuit 200 includes a multiplexer and a demultiplexer and as in a conventional circuit, the multiplexer receives input of the selection signal MSEL, the control signal MWE, the address signal MADDR and control system data MDATA from a processor element operating as a master of the second shared bus and selectively switches to the second shared bus in response to a signal corresponding to right to use bus of the second shared bus from the second arbiter 205 to output the signal to a processor element operating as a slave of the second shared bus through the second shared bus, while the demultiplexer receives input of a control signal SREADY from the processor element operating as a slave through the second shared bus to switchedly distribute the signal to a processor element as a transfer destination which operates as a master.

As described in the foregoing, in FIG. 12, although the second shared bus circuit 200 has a MUX-type bus structure taking easiness of implementation of logic synthesis or the like into consideration, the circuit is allowed to have 3-state-type bus structure similarly to the first shared bus without causing any problem as long as implementation easiness and estimation of operation delay permit.

Similarly to the conventional art, at least one of the plurality of processor elements 01~0n outputs the bus request signal MREQ of the second shared bus in response to a transfer request for input/output data and as a master, outputs the control signal MWE and the address signal MADDR according to input of the bus grant signal MGRANT to burst-transfer the input/output MDATA in response to a control signal MREADY, while similarly to the conventional art, at least one of the processor elements 01~0n, as a slave connected through the second shared bus, receives input of a control signal SWE and an address signal SADDR and outputs the control signal SREADY to burst-transfer input/output data SDATA.

The second bus arbiter 205, similarly to conventional art, receives a bus request signal of the second shared bus from the plurality of processor elements 01~0n in each cycle and issues a bus grant signal of the second shared bus to a processor element having the highest priority to arbitrate rights to use bus.

Figure 13:
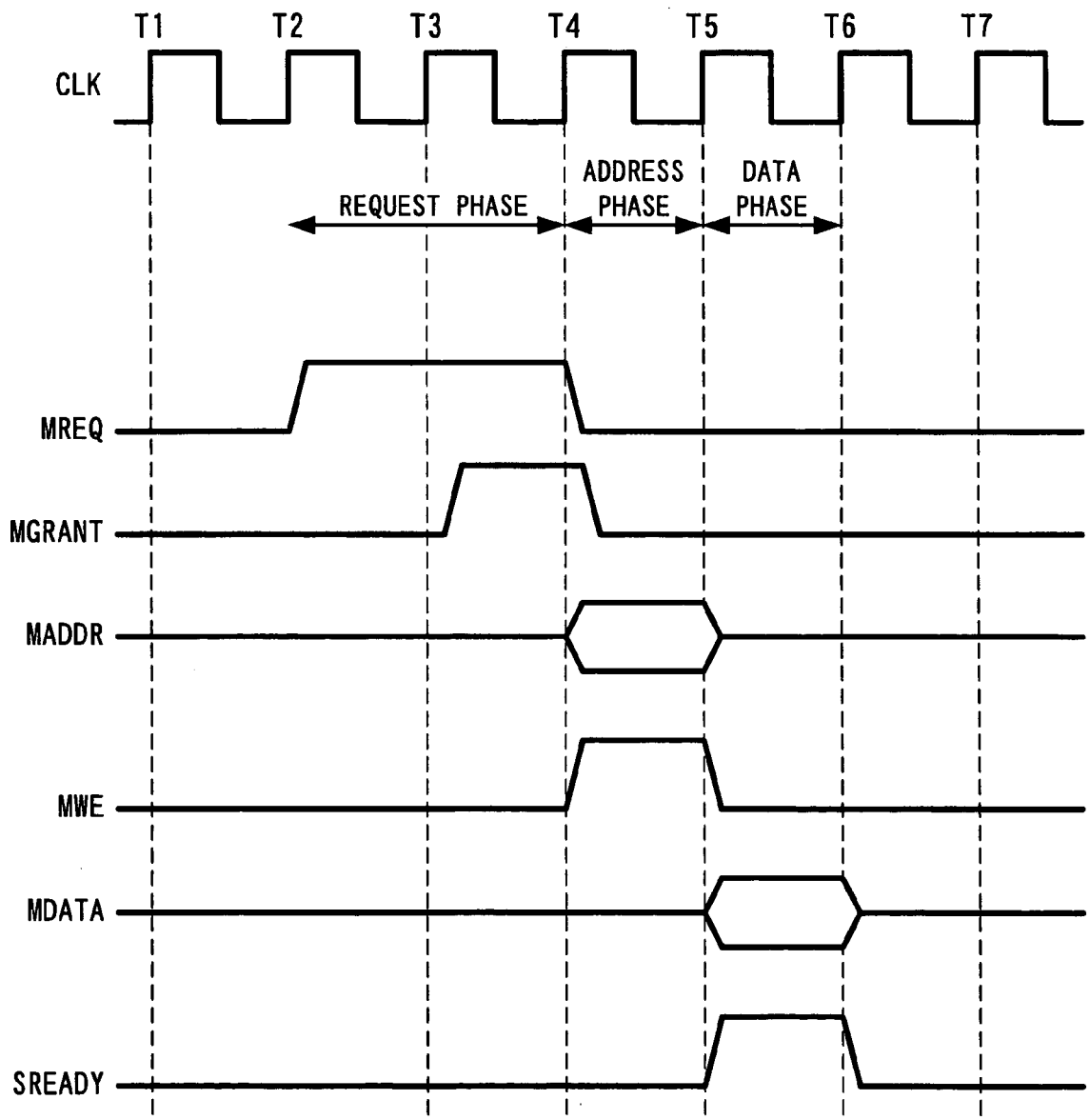
FIG. 13 is a timing chart showing an example of input/output data transfer by the second shared bus in FIG. 12.

In a case where the second shared bus is not shared, the second shared bus circuit 200 and the second bus arbiter 205 are unnecessary and a master and a slave are connected by a dedicated bus similarly to conventional art. FIG. 13 is a timing chart showing an example of input/output data transfer by the second shared bus. As illustrated in FIG. 13, in data transfer by the second shared bus, in a cycle subsequent to a cycle in which the address signal MADDR and the control signal MWE are issued, for example, the data signal MDATA corresponding to the address is output. First, a processor element wishing to conduct transfer issues the bus request signal MREQ to request the right to use bus at timing T2. Next, at timing T4, when latching the active bus grant signal MGRANT, the master outputs the address signal MADDR to bring the control signal MWE into the active state. The slave recognizes that the control signal MWE is at the active state to latch the address signal MADDR at the subsequent timing T5. At the same time, the master outputs the data signal MDATA corresponding to the address signal MADDR. The slave returns a response indicating whether write is possible to the latched address as the control signal SREADY. At timing T6 when the master latches the active control signal SREADY, transfer is completed, so that on the slave side, transfer data writing processing is conducted. On the other hand, in a case of a bus taking read transfer into consideration, the slave returns read data simultaneously with the issuance of the active control signal SREADY.

FIG. 14 is a block diagram showing a specific example in which the above-described multiprocessor system according to the present embodiment is applied to a specific W-CDMA digital baseband LSI. The multiprocessor system of this specific example includes a CCPU 300 as a processor element controlling the entire system of the W-CDMA digital baseband LSI, a control system data memory 301, an input/output data memory 302, an input/output data transfer DMA controller 303, processor elements 01~08 which conduct each processing of the digital baseband LSI, a debugging processing element 10, a first shared bus circuit 100 which mainly transfers control system data and is capable of conducting bidirectional transfer between all the processor elements, second shared bus circuits 200 and 201 which mainly transfer input/output data for reception data and transmission data whose transfer path is determined, first and second bus arbiters 105 and 205 which arbitrate rights to use each shared bus and bridge circuits 110 and 210 provided between the respective shared bus and the CCPU bus. Here, the processor elements 07 and 08 exist as an expansion processor element of HSDPA processing and GSM processing.

The multiprocessor system of this specific example is basically realized by controlling the respective processor elements 01~08 through the first shared bus with the processor element CCPU 300 serving as a master. Other processor elements 01~08 than the CCPU 300, however, can be a master of the first shared bus, so that transfer between the processor elements 01~08, which are slaves in a conventional bus, can be directly conducted without using the CCPU 300. More specifically, transfer of control system data such as an operation timing signal, a parameter signal, a status signal and an interruption signal between the processor elements 01~08 is directly conducted using the first shared bus.

Transfer of input/output data to be processed by each processor element is conducted by using the second shared bus. In the example shown in FIG. 14, the second shared bus is divided into two from a direction of transfer of the transfer data, the second shared bus circuits 200 and 201 which mainly transfer input/output data for reception data and transmission data. In the second shared bus circuit 200 for reception data, reception data is transferred from FEC, HSDPA and GSM which are the processor elements 05, 07 and 08 connected as a master to the input/output data memory 302 as a processor element connected as a slave. On the other hand, in the second shared bus circuit 201 for transmission data, demodulation data and transmission date are transferred from a DEM which is the processor element 04 connected as a master and the DMA controller 303 via the bridge circuit 210 to the FEC, MOD and GSM which are the processor elements 05, 06 and 08 connected as a slave.

Effect is that even when transfer of complicated control system data occurs during transfer of input/output data whose transfer traffic is heavy, by conducting transfer of control system data and input/output data by using different buses, a flexible system can be realized. It is for example possible to simultaneously conduct transfer of control system data by the CPU 300 and transfer of input/output data by the DMA controller 303. Similarly between other processor elements, transfer of control system data is possible during transfer of input/output data having the large volume of transfer data.

In addition, by structuring the entire multiprocessor system by using the first and second shared buses of the present embodiment such that the processor elements 07 and 08 are connected as expansion processor elements for HSDPA processing and GSM processing, addition, modification and deletion of such expansion processor elements can be flexibly realized with the specification of the first and second shared buses barely changed.

Figure 15:
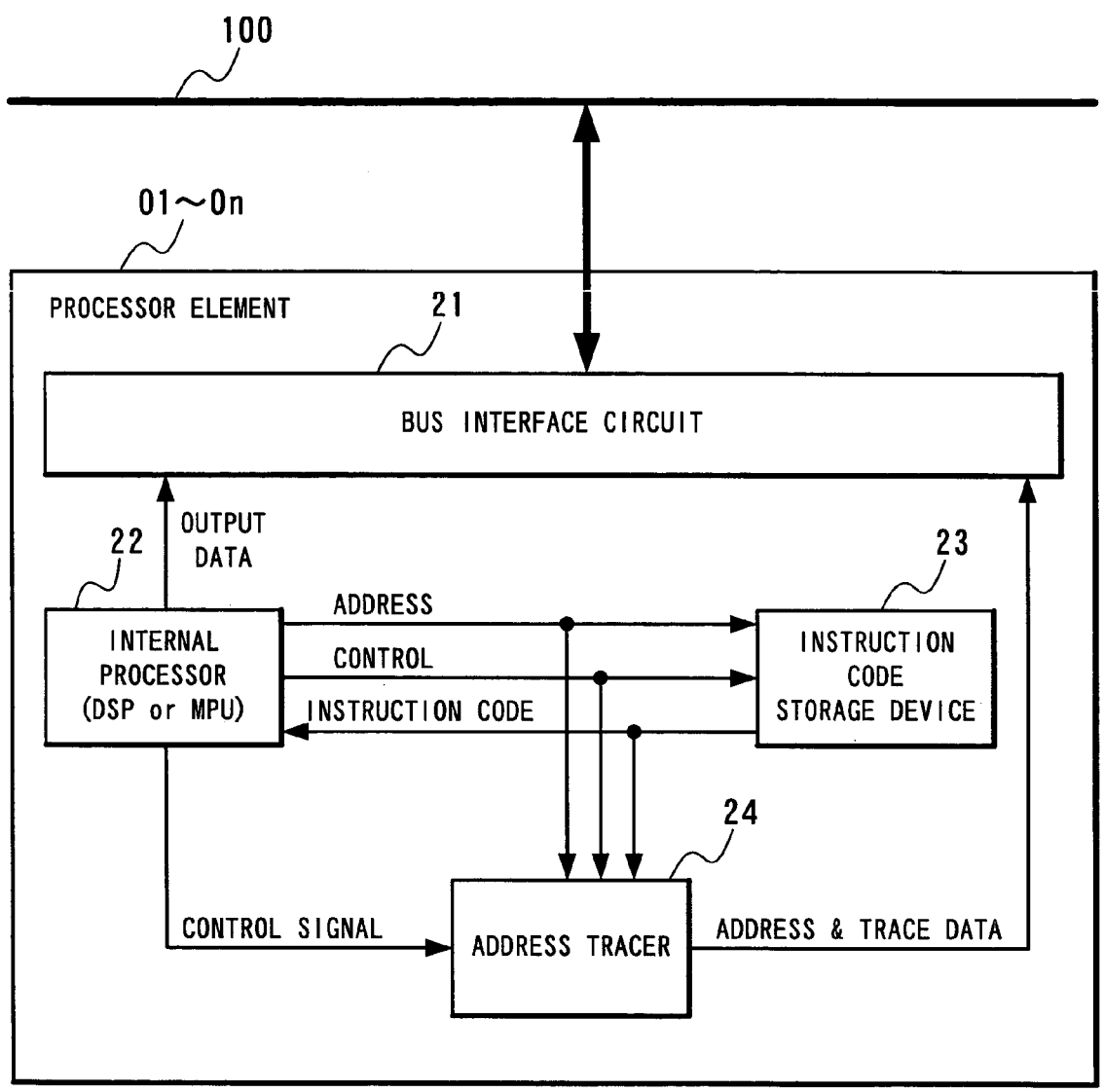
FIG. 15 is a partial block diagram showing a part of a structure of each processor element in a second embodiment of the multiprocessor system according to the present invention.
Figure 16:
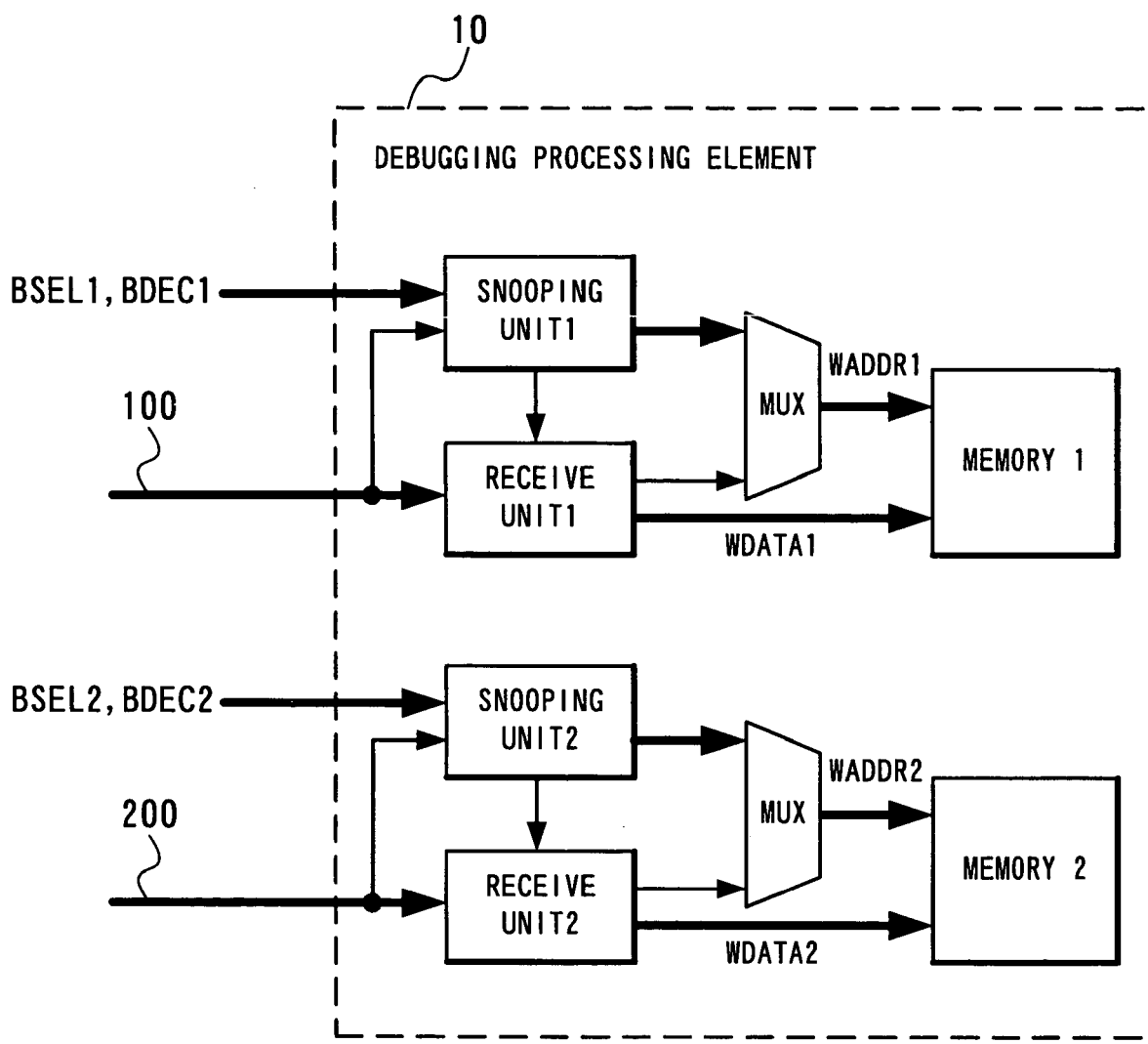
FIG. 16 is a partial block diagram showing a part of a structure of a debugging processing element in the second embodiment of the multiprocessor system according to the present invention.
Figure 17:
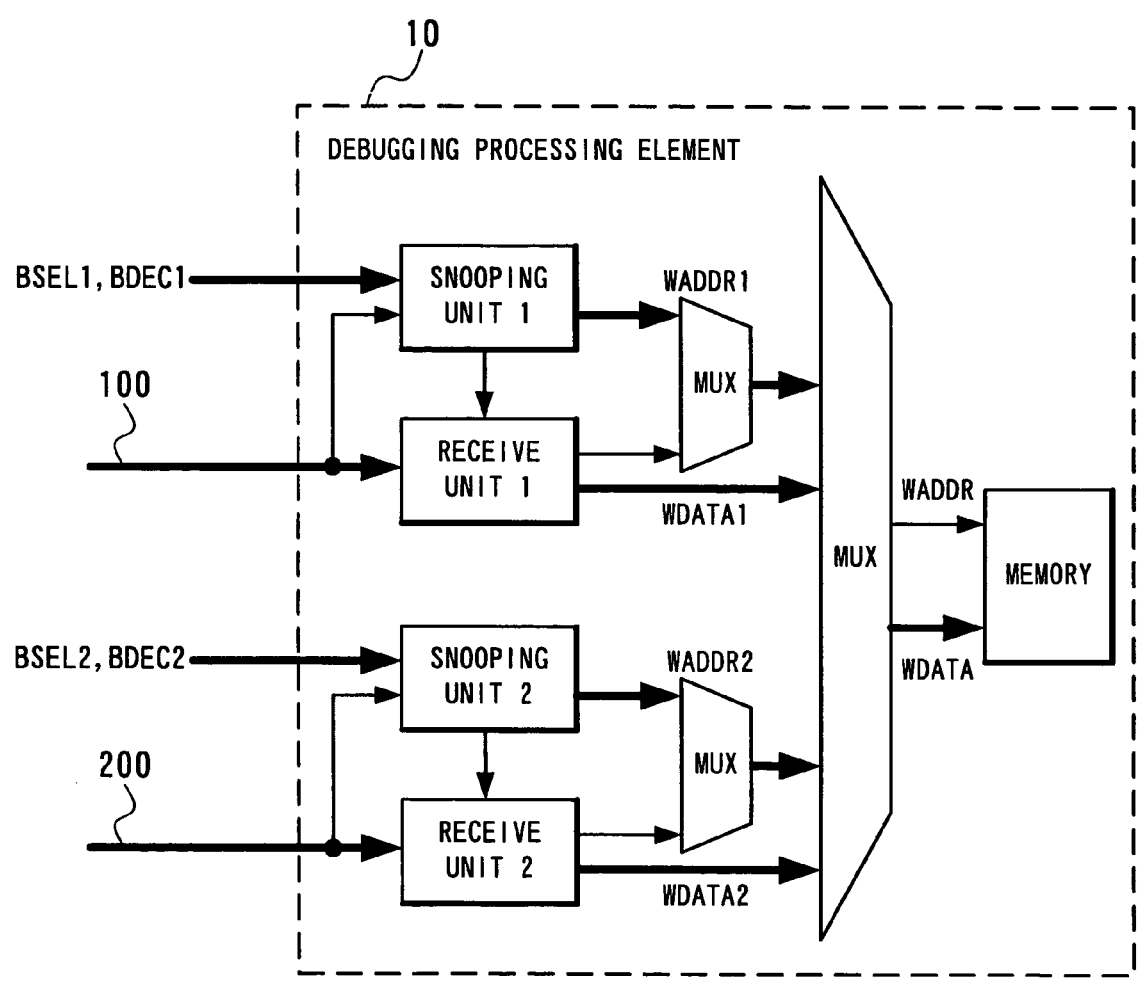
FIG. 17 is a partial block diagram showing a part of the structure of the debugging processing element in the second embodiment of the multiprocessor system according to the present invention.

FIGS. 15, 16 and 17 are partial block diagrams showing a part of structure of each processor element and a debugging processing element in a second embodiment of the multiprocessor system according to the present invention.

The structure of the multiprocessor system according to the present embodiment is as a whole the same as that of the multiprocessor system according to the first embodiment shown in FIG. 1 and each block other than the respective processor elements and the debugging processing element has the same structure, with the only difference in an internal structure of each processor element and the debugging processing element.

With reference to FIG. 15, each of processor elements 01~0n in the multiprocessor system according to the present embodiment includes an interface circuit 21 for the connection with the first shared bus, an internal processor 22 such as a DSP or an MPU which conducts various kinds of operations and control within a processor element, an instruction code storage device 23 which stores an instruction code of the internal processor 22, and an address tracer 24 having an instruction address tracing function. It is apparent that within each processor element, a dedicated hardware accelerator which conducts data processing and various kinds of registers and a storage device such as a memory may be provided.

Operation of these processor elements 01~0n will be described. First, when due to the specification of the entire multiprocessor system and the single processor element according the present embodiment, processing enters a debugging routine, the internal processor 22 such as a DSP or an MPU instructs the address tracer 24 to start instruction address trace by using a control signal to the address tracer 24.

Next, the address tracer 24 monitors an instruction address to the instruction code storage device 23 to generate trace data and transfer the trace data to the bus interface circuit 21. At this time, as a method of generating trace data, a method of transferring all the read instruction addresses without modification may be used or for the purpose of reducing the volume of trace data to be transferred, with the fact that an ordinary operation sequence is executed by an increment system having a simple increase taken into consideration, a method may be used, without any problem, of generating and transferring trace data only when address jump occurs such as branch or wait other than the ordinary operation.

Lastly, when output data exists in ordinary operation, the bus interface circuit 21 preferentially transfers the ordinary output data to the bus and only when the data fails to exist, that is, during ordinary data transfer, transfers generated trace data to the first shared bus circuit 100 toward DBGIF of the debugging processing element 10 as a transfer destination. More specifically, having a FIFO buffer for transferring and outputting data to the first shared bus circuit 100, the bus interface circuit 21 reads and transfers trace data in the FIFO buffer for trace data when no data remains in the FIFO buffer for ordinary data transfer.

With reference to FIG. 16, the debugging processing element 10 in the multiprocessor system according to the present embodiment includes receive units which latch output data on the shared bus, snooping units for debugging which determine whether transfer path on the shared bus satisfies desired conditions or not and two memories which store data latched for the first and second shared buses. Shown in FIG. 17 is a structure in which these two memories are combined into one to be shared by the first and second shared buses, so that the buses are switched by a multiplexer to write data.

Operation of the debugging processing element 10 will be described. Data latch by the receive unit includes two operations. One is to operate as a slave for the first and second shared buses. Latch the data when a transfer destination is the debugging processing element 10. The other is to execute bus monitoring for debugging. In this case, when in the snooping unit, transfer path conditions BSEL, BDEC and a write address SADDR of data transferred on the first and second shared buses satisfy a desired range, the receive unit latches the data and writes the same into the debugging memory. At this time, in a case of ordinary slave operation, the write address SADDR becomes an address transferred without modification and in a case of bus monitoring operation, it becomes an address designated by the snooping unit.

Although illustrated in FIGS. 16 and 17 is a case of writing data obtained by the debugging processing element 10 into a dedicated storage device, arrangement in which data is directly and externally output and monitored without writing into a storage device can be in practice used without any problem.

In the second embodiment, transferring trace data generated by the address tracing function of each processor element to the debugging storage device shared by all the processor elements by using the first shared bus leads to reduction in trace memory conventionally mounted on each processor element. This can be realized by the characteristic of the first shared bus that all the processor elements can be a master. Trace memory which is conventionally required for each processor element can be reduced and combined into a common debugging storage device enables efficient use of the multiprocessor system.

Further effect is that since trace data is transferred making use of a period where a shared bus in ordinary operation is not used, combining with a bus monitoring function enables simultaneous monitoring of transfer data between processor elements in ordinary operation and address trace data of one or a plurality of processor elements. In other words, it is not necessary to read data after once stopping operation and address trace information can be obtained during ordinary operation. In particular, by generating trace data limitedly at the time of branch or the like to reduce the volume of data, the degree of real time execution of address trace can be enhanced.

It should be noted that by making use of the same principle as that of the second embodiment, not only address trace data but also an arbitrary debugging data signal within a processor element at the time of debugging can be transferred to the debugging processing element 10 by using the first shared bus.

Figure 18:
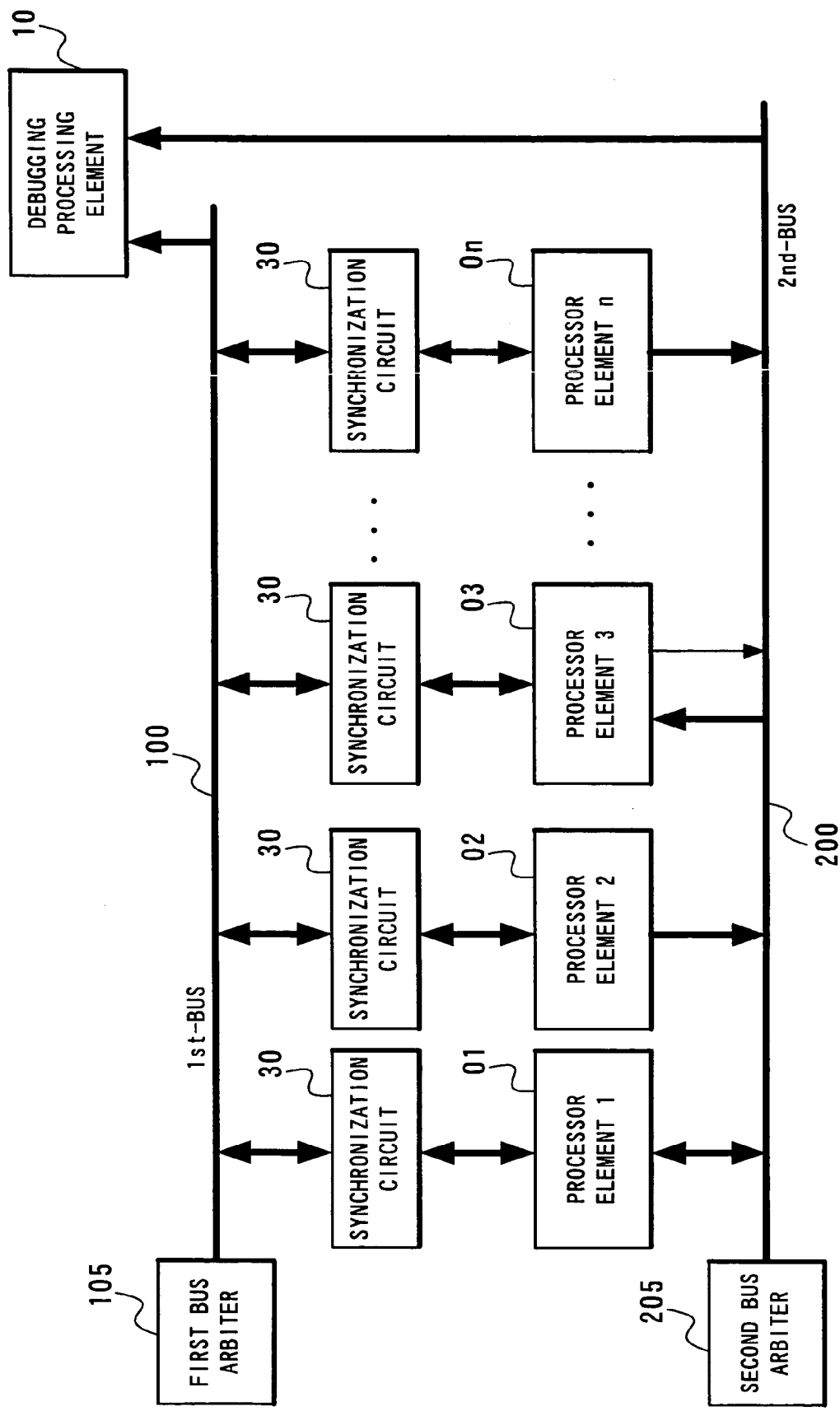
FIG. 18 is a block diagram showing a third embodiment of the multiprocessor system according to the present invention as a whole.

FIG. 18 is a block diagram showing a third embodiment of the multiprocessor system according to the present invention as a whole. With reference to FIG. 18, the entire structure of the multiprocessor system according to the present embodiment is obtained by inserting and adding synchronization circuits 30 between the respective processor elements 01~0n and the first bus arbiter 105 and the first shared bus circuit 100 in the multiprocessor system according to the first embodiment shown in FIG. 1. Each block other than the first bus arbiter 105 has the same structure as that of each block in the first embodiment and the first bus arbiter 105 has a different internal structure. In addition, although not shown in the figure, a clock generation circuit is provided which generates a bus clock signal having an integral multiple of a frequency of the basic clock signal in synchronization with the basic clock signal of the processor elements 01~0n and according to transfer traffic of the first shared bus.

Figure 19:
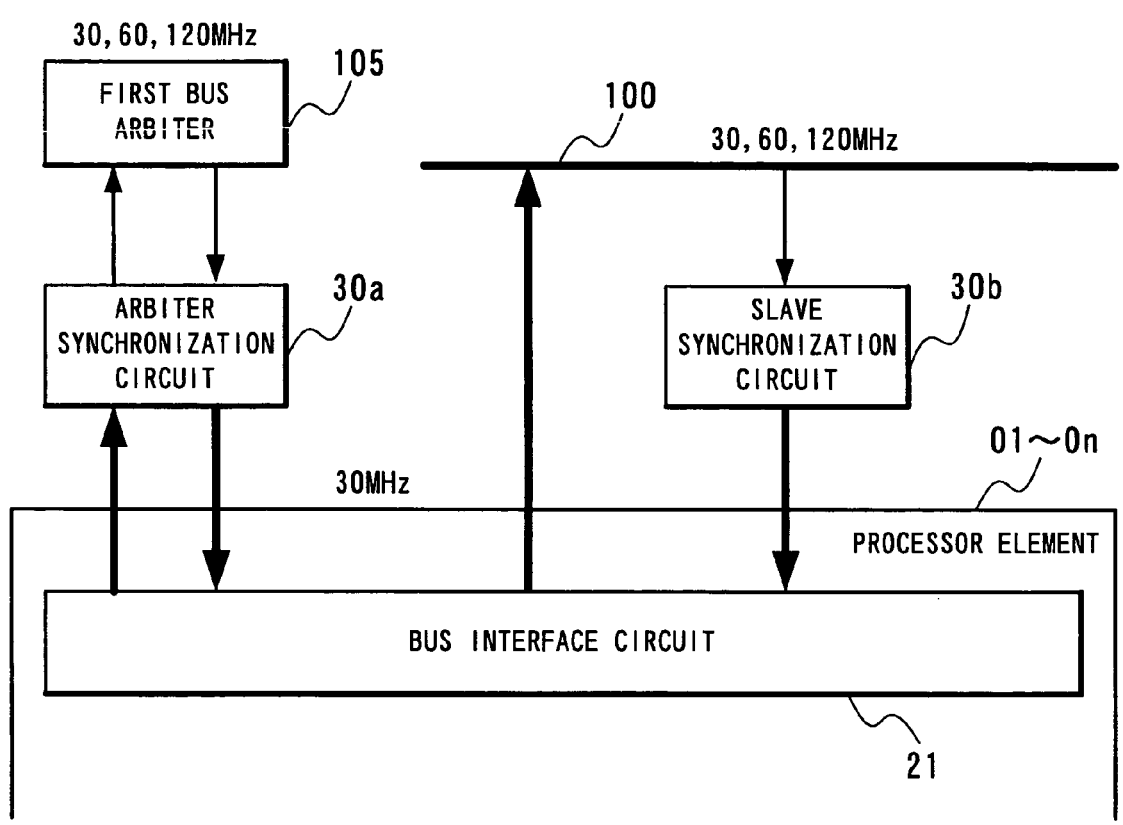
FIG. 19 is a diagram for use in explaining an inserted part of a synchronization circuit 30 inserted and added to the multiprocessor system shown in FIG. 18.
Figure 20:
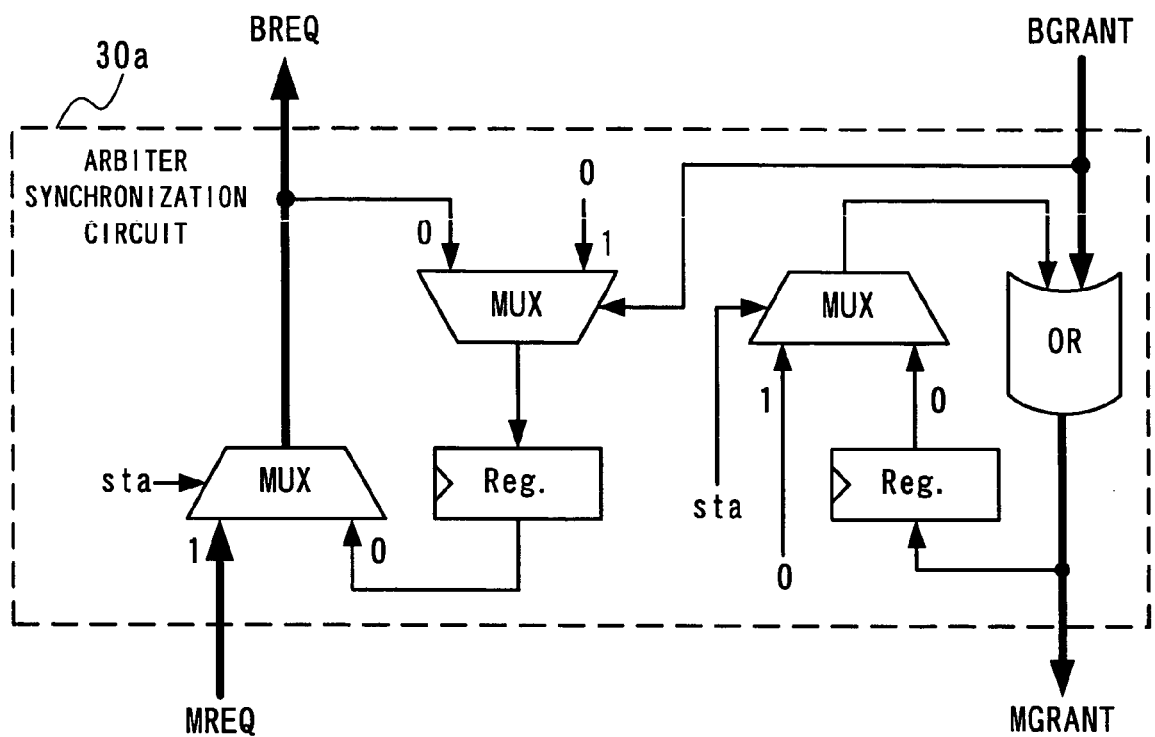
FIG. 20 is a block diagram showing an example of a structure of an arbiter synchronization circuit 30a illustrated in FIG. 19.
Figure 21:
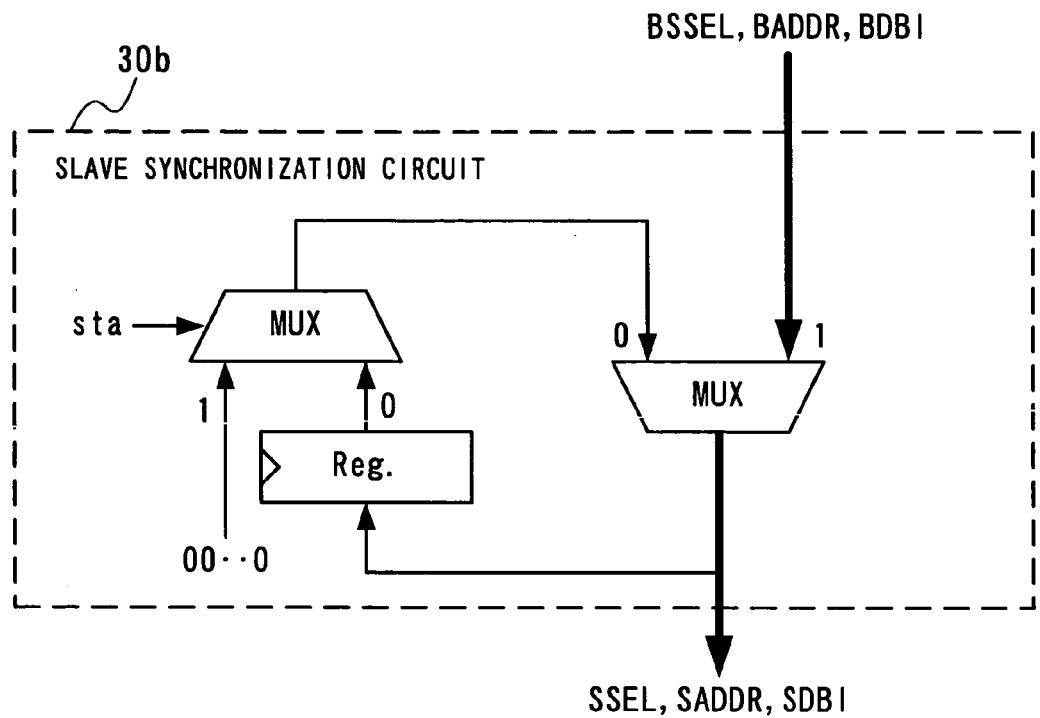
FIG. 21 is a block diagram showing an example of a structure of a slave synchronization circuit 30b illustrated in FIG. 19.
Figure 22:
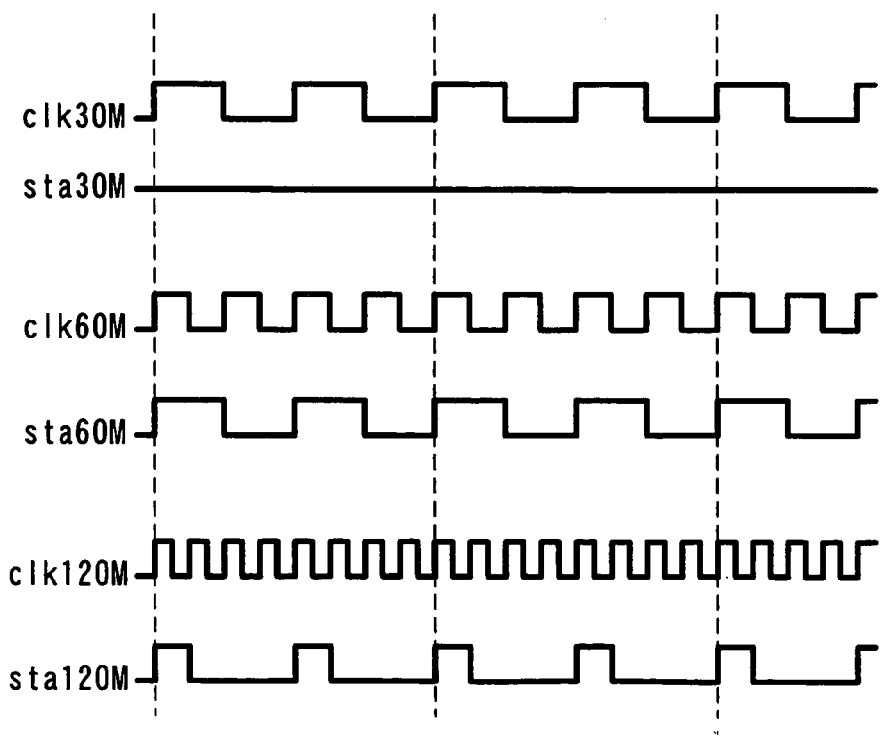
FIG. 22 is a timing chart showing operation of a bus clock signal and a basic clock signal supplied to the arbiter synchronization circuit 30a illustrated in FIG. 20 and the slave synchronization circuit 30b illustrated in FIG. 21.

FIG. 19 is a diagram for use in explaining a part where the synchronization circuit 30 is inserted and added to the multiprocessor system of the present embodiment. An arbiter synchronization circuit 30a is inserted between each of the processor elements 01~0n and the first bus arbiter 105 and a slave synchronization circuit 30b is inserted between a slave input of each of the processor elements 01~0n and the first shared bus circuit 100. FIGS. 20 and 21 are block diagrams showing examples of structures of the arbiter synchronization circuit 30a and the slave synchronization circuit 30b shown in FIG. 19, respectively, and FIG. 22 is a timing chart showing operation of a bus clock signal and a basic clock signal supplied to the arbiter synchronization circuit 30a shown in FIG. 20 and the slave synchronization circuit 30b shown in FIG. 21.

The arbiter synchronization circuit 30a in FIG. 20 includes an additional circuit which synchronizes a bus request signal MREQ issued from each processor element in synchronization with a basic clock signal with a bus clock signal and transfers the signal as a signal BREQ to the bus arbiter and an additional circuit which synchronizes a bus grant signal BGRANT issued from the first bus arbiter 105 in synchronization with a variable bus clock signal with the basic clock signal and transfers the signal as a signal MGRANT to the bus interface circuit 21 of each processor element.

Even when the bus request signal MREQ is issued in synchronization with the basic clock signal, if the bus grant signal BGRANT attains an active state, these additional circuits bring the bus request signal BREQ to the bus arbiter into an inactive state in the remaining bus cycle in the cycle of the basic clock signal. In addition, although the bus grant signal BGRANT is issued in synchronization with the bus clock signal, the bus grant signal can be held until the timing of a next rise of the basic clock signal and transferred to the bus interface circuit of the processor element.

The slave synchronization circuit 30b shown in FIG. 21 includes an additional circuit which synchronizes transfer data signals BSSEL, BADDR and BDBI applied from the first shared bus circuit 100 in synchronization with the bus clock signal with the basic clock signal to transfer the signals as signals SSEL, SADDR and SDBI.

Although when transfer is made from the first shared bus to one slave in synchronization with the bus clock signal, at the most one transfer is generated to the same slave during one cycle of the basic clock, this additional circuit enables the transfer data to be held until the timing of a next rise of the basic clock at which the bus interface circuit of a processor element latches the data.

While the arbiter synchronization circuit 30a and the slave synchronization circuit 30b basically operate in synchronization with a variable bus clock signal, they are characterized in that clock to an internal register can be stopped when frequency of the bus clock signal is the lowest, that is, it is a frequency of the basic clock signal.

Figure 23:
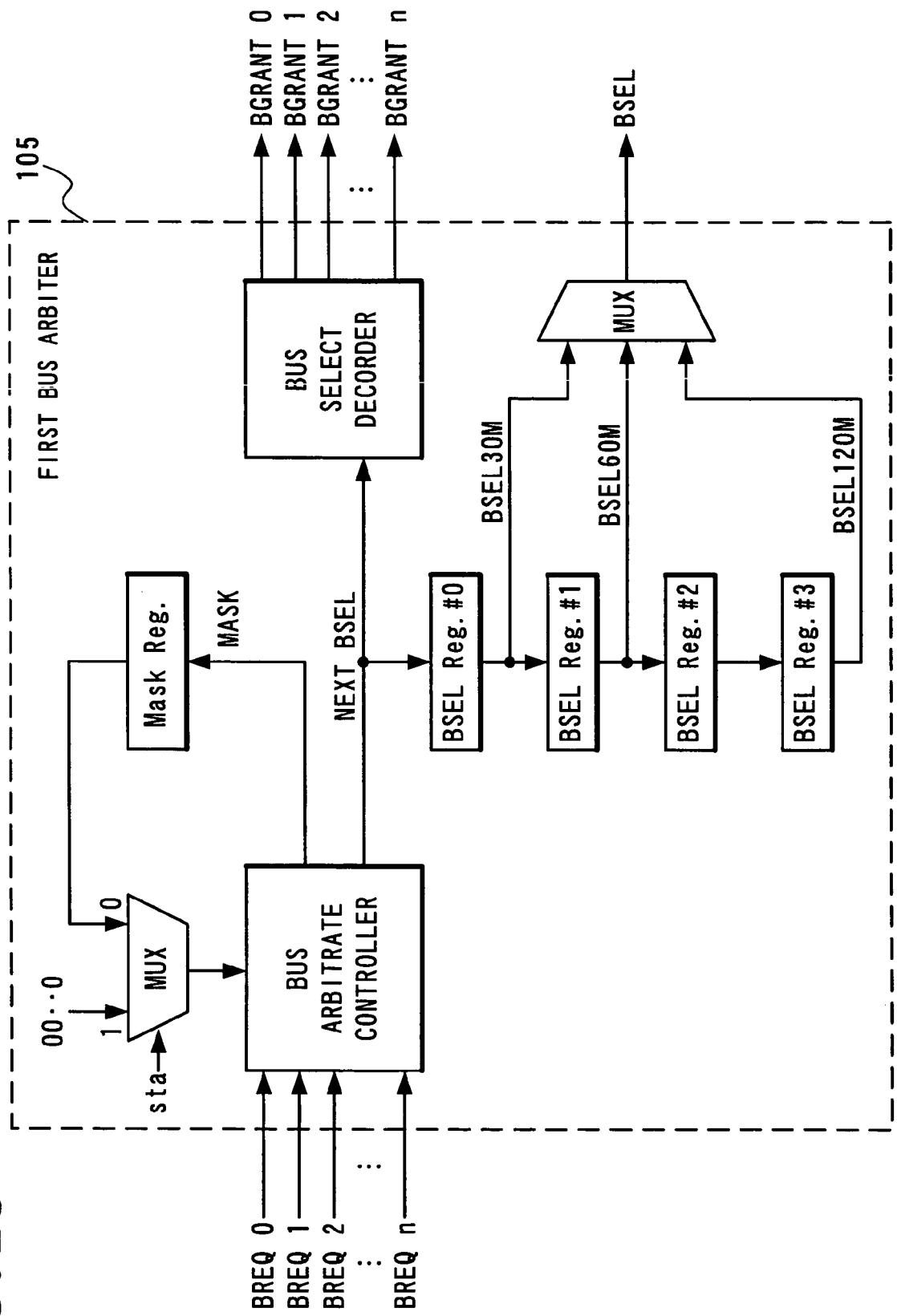
FIG. 23 id a block diagram showing an example of a structure of a first bus arbiter in the multiprocessor system illustrated in FIG. 18.
Figure 24:
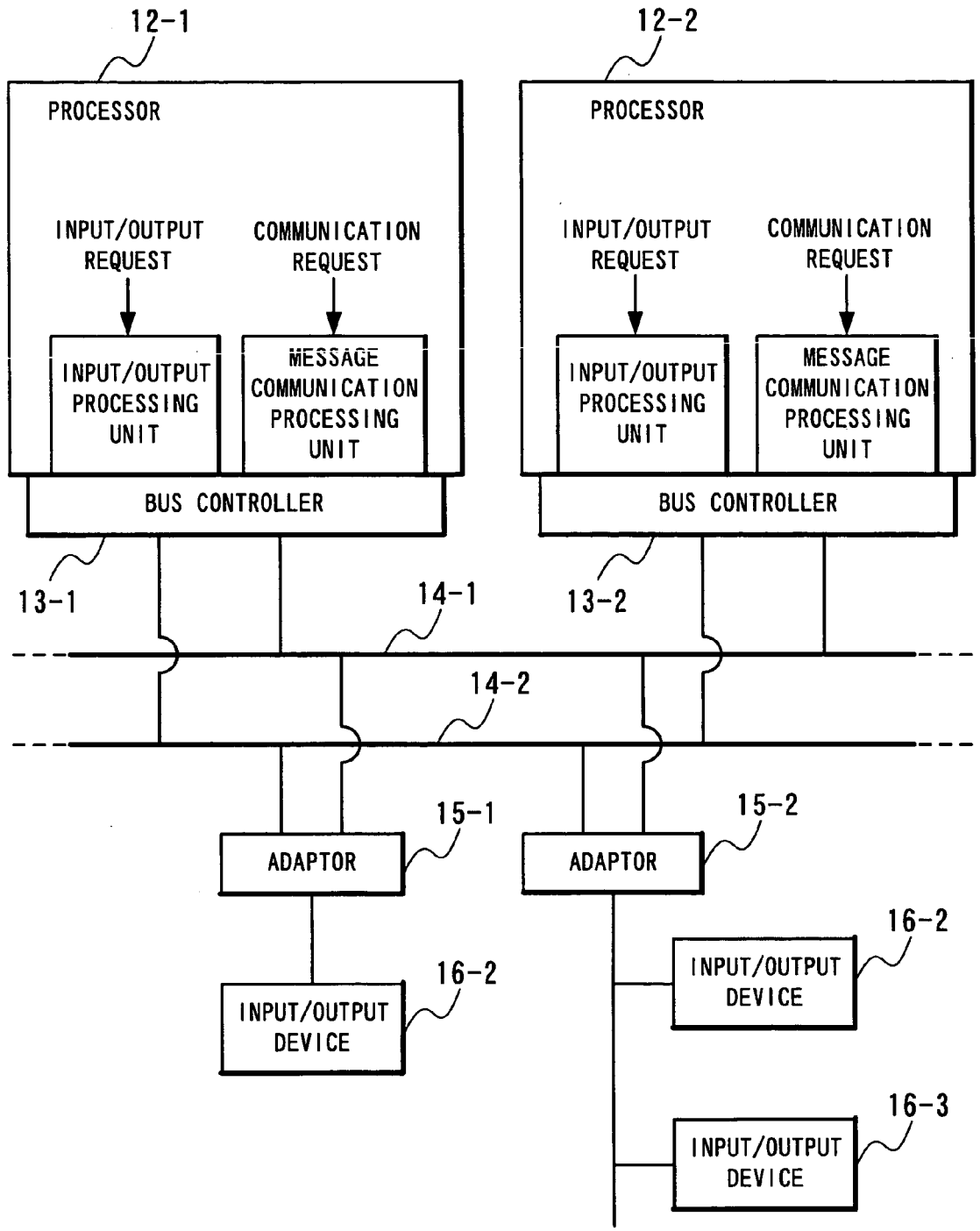
FIG. 24 is a block diagram showing an example of a structure of a conventional multiprocessor system.

FIG. 23 is a block diagram showing an example of a structure of the first bus arbiter in the multiprocessor system according to the present embodiment. With reference to FIG. 23, the first bus arbiter in the multiprocessor system according to the present embodiment is obtained by adding, to the first bus arbiter shown in FIG. 1, a musk function of receiving and masking a bus request signal of the first shared bus from the plurality of processor elements through the arbiter synchronization circuit once in each cycle of the basic clock signal and a delay function of arbitrating rights to use bus in each bus cycle in a period from the issuance of the bus grant signal of the first shared bus to the subsequent cycle to output a signal.

With these mask function and delay function, in a case, for example, where the frequency of the bus clock signal is once, twice and four-times the frequency (30 MHz) of the basic clock signal as shown in FIG. 23, the first shared bus circuit 100 is operated by a bus selection signal BSEL corresponding to the bus arbitration results as of one-bus cycle before, two cycles before and four cycles before. In the same cycle of the basic clock, transfer with the same processor element as a slave can be conducted once at the most and each processor element can be all the time operated based on the basic clock without depending on the bus clock signal.

As described in the foregoing, the first bus arbiter in the multiprocessor system according to the present embodiment operates the first shared bus circuit 100 at a frequency of the bus clock signal which is a constant multiple of the frequency of the basic clock signal in order to guarantee transfer traffic of the first shared bus circuit 100 and to prevent an increase in a circuit scale which is caused by an increase in the physical number of buses.

At this time, since operating the circuit at a constant multiple of clock all the time results in increasing the number of switching of the circuit to increase power consumption, bus clock is set to be variable. For example, in a processing routine whose transfer traffic is heavy and address trace at the time of debugging shown in the second embodiment, the first shared bus circuit 100 is operated using a bus clock signal faster than the basic clock signal.

More specifically, the first shared bus circuit 100 using a variable clock according to the present embodiment is structured to monitor any signal by using dedicated hardware all the time, such that completely dynamic clock switching is not conducted but in practice a switch signal is issued from a CPU or the like to switch the bus clock only when a processing routine of the entire system enters a routine whose transfer traffic is heavy or only when other certain conditions are satisfied.

For these synchronization circuit 30 and first bus arbiter, only a start position signal sta shown in FIG. 22, for example, is required. With the basic clock signal having 30 MHz and variable bus clock signals having 30 MHz, 60 MHz and 120 MHz, the start position signal sta attains an active state only in one cycle in synchronization with a variable bus clock signal at the timing of a rise of the basic clock signal. In a processor element, at the data output side for the first shared bus, no additional circuit is required.

By setting an operation clock of a bus to be variable (constant multiple), the multiprocessor system of the present embodiment enables transfer traffic to be ensured in a wider range while better suppressing overhead in circuit scale than in a case where the physical number of buses is increased. This increases a possibility of flexibly coping with generation of new transfer traffic to enable expansion with more ease. In addition, as compared with a high-speed transfer bus having a bus operation clock set to be fast all the time, variable clock which is set to be fast only when necessary realizes reduction in power consumption.

Moreover, by controlling switching of a bus operation clock at a macro-system-level through, for example, use of a high-speed bus operation clock in a processing routine in which transfer is made many times and at the time of debugging, an efficient system in terms of the circuit scale and power consumption can be realized. Lastly, when the shared bus operates in synchronization with the basic clock, an input clock at all the registers in the synchronization circuit 30 can be stopped to realize lower power consumption.

As described in the foregoing, the present invention expects the following effects.

First effect is to efficiently conduct both transfer between all the processor elements and high-speed data transfer while suppressing an increase in circuit scale.

The reasons are as follows. Unlike conventional processor elements, with transfer data in every data transfer by the processor elements divided into two kinds, control system data and input/output data, the processor element according to the present invention acquires right to use bus of the first or second shared bus in response to a request for transfer of the control system data or the input/output data and as a master, conducts multiplex-transfer or burst-transfer of the data to allow the first shared bus to conduct transfer between all the processor elements, and with only a minimum necessary write transfer function, the right to use bus is released at the time when a read return request is transferred for writing and during a period before return data is ready, the bus can be assigned to a processor element who wants other transfer, while the second shared bus has limited processor elements connected and transfer direction.

Second effect is to speed up transfer of control system data between all the processor elements and data processing in each processor element to reduce power consumption, thereby speeding up the entire multiprocessor system and reducing power consumed therein.

The reasons are that for transfer itself of control system data through the first shared bus, activation of a processor element as a specific master is unnecessary, that data can be transferred between bus interfaces of the respective processor elements through the first shared bus, that processing by an internal processor in each processor element is unnecessary and that the first shared bus circuit can be operated at a bus cycle faster by an integral multiple than a cycle of the basic clock signal of the processor element according to transfer traffic.

Third effect is to have excellent easiness of expansion and reuse of resources and reduction in development period of the multiprocessor system, thereby further reducing development costs.

The reasons are that even when unexpected transfer path is generated between the processor elements due to addition and modification of the processor element following change of system specification, control system data including an interruption request can be as well transferred through the first shared bus allowing transfer between all the processor elements to flexibly cope with addition or modification with barely requiring a change of the entire bus specification and connection arrangement, and that even the addition and modification made of transfer of unexpectedly large volume of data between the processor elements can be coped with by adding or changing connection arrangement of the second shared bus.

Fourth effect is to facilitate test and debugging.

The reasons are that trace data generated by the address tracing function of each processor element is transferred to the debugging storage device common to all the processor elements by making use of a period where the first shared bus in ordinary operation is not used, that combination with the bus monitoring function enables transfer data between the processor elements in ordinary operation and address trace data of one or a plurality of processor elements to be monitored simultaneously, and that the first shared bus circuit can be operated in a bus cycle faster by an integral multiple than a cycle of the basic clock signal of the processor element according to transfer traffic.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A multiprocessor system having a plurality of processor elements each conducting data processing to obtain a right to use a particular bus of a plurality of shared buses in response to a transfer request for control system data or input/output data and as a master, conduct multiplex-transfer or burst-transfer, wherein a particular one of said processor elements outputs a bus request signal for a specific shared bus in response to a transfer request for said control system data and as a master, transfers and outputs a selection signal, a control signal and an address signal of a transfer destination and said control system data in one cycle in response to application of a bus grant signal, and said particular processor element is selected as a slave based on said selection signal through said specific shared bus to receive input of said control system data and process the data based on said control signal and said address signal.

2. The multiprocessor system as set forth in claim 1, wherein the plurality of shared buses include a first shared bus for multiplex-transferring said control system data and a second shared bus for burst-transferring said input/output data.

3. The multiprocessor system as set forth in claim 1, comprising:

a shared bus circuit which receives input of said selection signal, said control signal, said address signal and said control system data from said plurality of processor elements, selectively outputs the signals and the data to a specific shared bus corresponding to right to use bus of said specific shared bus and selects one of said plurality of processor elements as a slave based on said selection signal through said specific shared bus to output said control signal, said address signal and said control system data, and a bus arbiter which accepts a bus request signal from said plurality of processor elements in each cycle and issues a bus grant signal of said specific shared bus to a processor element having the highest priority to arbitrate rights to use the bus for a subsequent cycle.

4. The multiprocessor system as set forth in claim 3, wherein said shared bus circuit includes:
- a multiplexer which receives input of said selection signal, said control signal, said address signal and said control system data from said plurality of processor elements to selectively output the signals and the data to said specific shared bus corresponding to right to use bus of said specific shared bus,
- a decoder which decodes said selection signal on said specific shared bus to select one of said plurality of processor elements as a slave of a transfer destination, and
- a demultiplexer which receives input of said control signal, said address signal and said control system data on said specific shared bus to distribute the signals and the data to a slave of a transfer destination according to an output of said decoder.

5. The multiprocessor system as set forth in claim 1, wherein said processor element conducts
- write transfer of outputting a bus request signal of said specific shared bus in response to a transfer request of said control system data, as a master, transferring and outputting said control system data in response to application of a bus grant signal and as a slave selected based on said selection signal through said specific shared bus, receiving input of said control system data to conduct memory write based on said control signal and said address signal,
- read return request transfer of outputting a bus request signal of said specific shared bus in response to a transfer request for control system data including a return destination code, as a master, transferring and outputting said return destination code in response to application of a bus grant signal and as a slave selected based on said selection signal through said specific shared bus, receiving input of said return destination code and reading memory data based on said control signal and said address signal to make a return request with the read memory data as control system data, and
- return write transfer of outputting a bus request signal of said specific shared bus in response to said return request, as a master, transferring and outputting a selection signal corresponding to said return destination code in response to application of a bus grant signal and as a slave selected based on said selection signal through said specific shared bus, receiving input of said control system data to conduct memory write based on said control signal and said address signal.

6. The multiprocessor system as set forth in claim 1, comprising:
- a shared bus circuit which receives input of said selection signal, said control signal, said address signal and said control system data from said plurality of processor elements, selectively outputs the signals and the data to a specific shared bus corresponding to a right to use bus of said specific shared bus and selects one of said plurality of processor elements as a slave based on said selection signal through said specific shared bus to output said control signal, said address signal and said control system data, and
- a bus arbiter which accepts a bus request signal from said plurality of processor elements in each cycle and issues a bus grant signal of said specific shared bus to a processor element having the highest priority to arbitrate rights to use the specific shared bus for a subsequent cycle, wherein said processor element conducts
- write transfer of outputting a bus request signal of a first shared bus in response to a transfer request of said control system data, as a master, transferring and outputting said control system data in response to application of a bus grant signal and as a slave selected based on said selection signal through said specific shared bus, receiving input of said control system data to conduct memory write based on said control signal and said address signal,
- read return request transfer of outputting a bus request signal of said specific shared bus in response to a transfer request for control system data including a return destination code, as a master, transferring and outputting said return destination code in response to application of a bus grant signal and as a slave selected based on said selection signal through said specific shared bus, receiving input of said return destination code and reading memory data based on said control signal and said address signal to make a return request with the read memory data as control system data, and
- return write transfer of outputting a bus request signal of said specific shared bus in response to said return request, as a master, transferring and outputting a selection signal corresponding to said return destination code in response to application of a bus grant signal and as a slave selected based on said selection signal through said specific shared bus, receiving input of said control system data to conduct memory write based on said control signal and said address signal.

7. The multiprocessor system as set forth in claim 1, wherein one of the shared buses includes:
- a multiplexer which receives input of said selection signal, said control signal, said address signal and said control system data from said plurality of processor elements to selectively output the signals and the data to said specific shared bus corresponding to right to use bus of said specific shared bus,
- a decoder which decodes said selection signal on said specific shared bus to select one of said plurality of processor elements as a slave of a transfer destination, and
- a demultiplexer which receives input of said control signal, said address signal and said control system data on said specific shared bus to distribute the signals and the data to a slave of a transfer destination according to an output of said decoder, wherein said particular processor element conducts
- write transfer of outputting a bus request signal of the first shared bus in response to a transfer request of said control system data, as a master, transferring and outputting said control system data in response to application of a bus grant signal and as a slave selected based on said selection signal through said specific shared bus, receiving input of said control system data to conduct memory write based on said control signal and said address signal,
- read return request transfer of outputting a bus request signal of said specific shared bus in response to a transfer request for control system data including a return destination code, as a master, transferring and outputting said return destination code in response to application of a bus grant signal and as a slave selected based on said selection signal through said specific shared bus, receiving input of said return destination code and reading memory data based on said control signal and said address signal to make a return request with the read memory data as control system data, and return write transfer of outputting a bus request signal of said specific shared bus in response to said return request, as a master, transferring and outputting a selection signal corresponding to said return destination code in response to application of a bus grant signal and as a slave selected based on said selection signal through said specific shared bus, receiving input of said control system data to conduct memory write based on said control signal and said address signal.

8. The multiprocessor system as set forth in claim 5, wherein said processor element, as a slave selected based on said selection signal through said specific shared bus, makes a memory write or memory read return request not by internal interruption processing but by means of a dedicated memory control unit based on said control signal and said address signal.

9. The multiprocessor system as set forth in claim 5, wherein said processor element conducts interruption request transfer of outputting a bus request signal of said specific shared bus in response to a transfer request for control system data including an interruption request, as a master, transferring and outputting said interruption request in response to application of a bus grant signal, being selected based on said selection signal through said specific shared bus and as a slave, receiving input of said interruption request to conduct internal interruption processing corresponding to said interruption request based on said control signal and said address signal.

10. The multiprocessor system as set forth in claim 9, wherein said interruption request includes an interruption factor and a transfer source code.

11. The multiprocessor system as set forth in claim 1, comprising a debugging processing element which snoops said control system data and said input/output data on said plurality of shared buses based on a transfer path and an address range to store the data in a debugging memory.

12. The multiprocessor system as set forth in claim 1, wherein said processor element traces an execution instruction address of an internal processor to generate trace data as control system data and outputs a bus request signal for said specific shared bus in response to a transfer request for the data to, as a master, transfer and output said trace data in response to application of a bus grant signal.

13. The multiprocessor system as set forth in claim 11, wherein said processor element traces an execution instruction address of an internal processor to generate trace data as control system data and outputs a bus request signal for said specific shared bus in response to a transfer request for the data to, as a master, transfer and output said trace data in response to application of a bus grant signal, and said debugging processing element, as a slave selected based on said selection signal through said specific shared bus, receives input of said trace data to store the data in the debugging memory based on said control signal and said address signal.

14. The multiprocessor system as set forth in claim 1, comprising:

a clock generation circuit which generates, in synchronization with a basic clock signal of said processor element and according to transfer traffic of said specific shared bus, a bus clock signal whose frequency is an integral multiple of a frequency of said basic clock signal, an arbiter synchronization circuit which receives input of a bus request signal of said specific shared bus from said processor element to output the signal to a bus arbiter in synchronization with said bus clock signal and receives input of a bus grant signal of said specific shared bus from said bus arbiter to output the signal to said processor element in synchronization with said basic clock signal, and a slave synchronization circuit which receives input of said selection signal, said control signal, said address signal and said control system data through said specific shared bus to output the signals and the data to said processor element in synchronization with said basic clock signal, wherein said bus arbiter accepts a bus request signal of said specific shared bus from said plurality of processor elements through said arbiter synchronization circuit once in each cycle of said basic clock signal and issues a bus grant signal of said specific shared bus to a processor element having the highest priority in each bus cycle of said bus clock signal through said arbiter synchronization circuit to arbitrate rights to use bus in each bus cycle of a subsequent cycle.

15. The multiprocessor system as set forth in claim 1, comprising:

a processor element which operates as one of said plurality of processor elements to output a bus request signal of other shared bus than said specific shared bus in response to a transfer request for said input/output data and as a master, burst-transfers said input/output data in response to application of a bus grant signal, and a processor element which operates as one of said plurality of processor elements to, as a slave connected through said other shared bus, burst-transfer said input/output data.

16. The multiprocessor system as set forth in claim 15, comprising:

a second shared bus circuit which selectively connects a processor element operating as a master or a slave of said other shared bus to said other shared bus according to right to use bus of said other shared bus to burst-transfer said input/output data between the master and the slave through said other shared bus, and a second bus arbiter which accepts a bus request signal of said other shared bus from said plurality of processor elements in each cycle and issues a bus grant signal of said other shared bus to a processor element having the highest priority to arbitrate rights to use bus.

17. A multiprocessor system having a plurality of processor elements each conducting data processing to obtain a right to use a specific bus of a plurality of shared buses in response to a transfer request for control system data or input/output data and as a master, conduct multiplex-transfer or burst-transfer, wherein said processor element, as a master, transfers and outputs a selection signal, a control signal and an address signal of a transfer destination and said control system data through the specific shared bus in response to a transfer request for said control system data, and said processor element selected as a slave based on said selection signal through said specific shared bus receives input of said control system data and processes the data based on said control signal and said address signal.

18. A multiprocessor system having a plurality of processor elements each conducting data processing to obtain a right to use a particular bus of a plurality of shared buses in response to a transfer request for control system data or input/output data and as a master, conduct multiplex-transfer or burst transfer, wherein a particular one of said processor elements outputs a bus request signal for a specific shared bus in response to a transfer request for said control system data and as a master, transfers and outputs a selection signal, a control signal, and an address signal of a transfer destination and said control system data in response to application of a bus grant signal, and said particular processor element is selected as a slave based on said selection signal through said specific shared bus to receive input of said control system data and process the data based on said control signal and said address signal.

* * * * *